United States Patent [19]

Mori et al.

[11] Patent Number: 5,584,591
[45] Date of Patent: Dec. 17, 1996

[54] TAPE PRINTER

[75] Inventors: Masaharu Mori, Anjyo; Mayumi Nishio, Nagoya; Mika Oshige, Nagoya; Sachie Kanda, Nagoya, all of Japan

[73] Assignee: Brother Kogyo Kabushiki Kaisha, Nagoya, Japan

[21] Appl. No.: 354,790

[22] Filed: Dec. 12, 1994

[30] Foreign Application Priority Data

Dec. 14, 1993 [JP] Japan ..................... 5-342975

[51] Int. Cl.⁶ ..................................... B41J 3/46
[52] U.S. Cl. .......................... 400/615.2; 400/83
[58] Field of Search ................ 400/61, 76, 83, 400/615.2; 345/129; 395/110, 150, 151

[56] References Cited

U.S. PATENT DOCUMENTS

| | | | |
|---|---|---|---|
| 5,066,152 | 11/1991 | Kuzuya et al. | 400/621 |
| 5,188,469 | 2/1993 | Nagao et al. | 400/615.2 |
| 5,314,256 | 5/1994 | Niwa | 400/61 |
| 5,344,247 | 9/1994 | Sakuragi et al. | 400/615.2 |
| 5,399,030 | 3/1995 | Niwa et al. | 400/61 |
| 5,413,420 | 5/1995 | Ishida et al. | 400/61 |
| 5,447,378 | 9/1995 | Otsuka et al. | 400/76 |

FOREIGN PATENT DOCUMENTS

| | | | |
|---|---|---|---|
| 0440496 | 8/1991 | European Pat. Off. | 400/615.2 |
| 497352 | 8/1992 | European Pat. Off. | 400/615.2 |
| 0608055 | 7/1994 | European Pat. Off. | 400/615.2 |
| 0644506 | 3/1995 | European Pat. Off. | 400/615.2 |
| 1-85050 | 6/1989 | Japan | 400/615.2 |
| 2-106555 | 4/1990 | Japan | 400/615.2 |

Primary Examiner—Edgar S. Burr
Assistant Examiner—Steven S. Kelley
Attorney, Agent, or Firm—Oliff & Berridge

[57] ABSTRACT

When format information is changed, print area check data is generated as per the changed format information (S25). If the check data is found not to be printable within the print area of the tape defined by the printable width and set tape length ("YES" in S27), the changed format information is invalidated (S28), and a message indicating what has taken place appears on the display (S29). Whenever a character or the like is input, the corresponding print check data is generated (S33). If the data is found to be printable within the print area ("NO" in S35), a print-like image of that character is displayed; if the data is found not printable ("YES" in S35), a message indicating the unavailability of printing is displayed (S38), and the corresponding text appears on the display unit (S40).

30 Claims, 15 Drawing Sheets

| TAPE WIDTH (mm) | PRINTABLE WIDTH (PW) (dots) |
|---|---|
| 6 | 32 |
| 9 | 48 |
| 12 | 56 |
| 18 | 96 |
| 24 | 96 |

| PRINT CHARACTER SIZE (pt) | DISPLAY CHARACTER SIZE (dots) |
|---|---|
| 6 | 7 |
| 10 | 7 |
| 13 | 10 |
| 19 | 16 |
| 26 | 21 |
| 38 | 32 |
| 44 (BIG) | 32 (BIG) |

TAPE PRINTER

BACKGROUND OF THE INVENTION

1. Field of the Invention

The present invention relates to a tape printing apparatus for printing desired characters onto a print tape.

2. Description of the Related Art

U.S. Pat. No. 5,066,152 has proposed a tape printing apparatus including primarily a keyboard, a display unit, and a print mechanism for printing input text data of characters such as letters and symbols onto a print tape (e.g., a tape 18 or 24 mm wide) housed in a tape cassette as the print medium. The display unit displays the input text data in a predetermined character size in the same manner as the display screen of commonly used word processors. The tape printing apparatus, also provided with various edit functions, is particularly suitable for creating tapes that are used as labels of file titles and other storage case identifications.

SUMMARY OF THE INVENTION

The present inventors have come up with the idea of displaying on the display unit the text data input through the keyboard in print-like images, i.e., exactly as the data is to be printed on the print tape in accordance with desired print format information, especially with a desired print character size and a desired tape length. Operating a print key of the apparatus, while the text data from the keyboard is displayed on the display unit in print-like images, may cause the width of the tape to be detected and trigger a check on whether printing of the text data is available on the tape. Printing of the text data is carried out only if the printing is found to be available on the tape.

The above-described present inventors' motivated apparatus capable of displaying print-like images allows the input text data to be verified on the display before printing. When the print key is operated to order printing, a check is made to see if the text data can be printed on the tape in accordance with the tape width and other print format information. If printing of the text data is found to be unavailable in view of the print format, there may be two options, i.e., giving priority to either the print format information or the text data. If priority is given to the print format information, the amount of the text data needs to be reduced to comply with the print format; if priority is given to the text data, the print format information needs to be modified to accommodate the data. Such additional editing work will be one disadvantage of the apparatus, which must be dealt with by the user.

If the tape cassette is changed or the print format information is modified during text data input, the print-like images are modified on the display unit according to a newly corrected print character size. When a print order is given to execute printing, a check is made to see if printing of the text data is available in view of such data as the width of the tape in the newly installed tape cassette, the print character size of the modified print format information, and the set tape length of the new tape. If printing of the text data is found to be unavailable under such constraints, additional editing work also needs to be carried out, which will be another disadvantage of the apparatus for the user to deal with.

Although the apparatus allows the input text data to be verified as print-like images on the display unit, it is desired that the apparatus may display the text also in a predetermined character size, similarly as in common word processors. Where the tape printing apparatus has both the text display function and the print-like image display function, it is desired that the two functions can be switched alternately. It is preferable that the text data input through one of the two functions can be displayed using the other function.

It is therefore an object of the present invention to provide a tape printing apparatus which is capable of continuously judging whether printing of input text data is available even while the text data is being input, and which is capable of switching either to a print image display function or to a text display function.

In order to attain the above-described objectives, the present invention provides a tape printing apparatus for printing desired characters onto a tape, the apparatus comprising: input means for inputting desired characters and commands; data storing means for storing data of the input characters; font storing means for storing font data for either one of the outlines and the dot patterns of numerous characters inputtable by the input means; print means for printing characters onto a tape; format setting means for setting a print format including a character size for printing of the input characters; display font storing means for storing display dot pattern data for numerous characters inputtable by the input means; first display data generating means for reading display dot pattern data from the display font storing means for each of the characters stored in the data storing means and on the basis of the character size data set by the format setting means, thereby composing display dot image data for displaying images of desired characters exactly as they are to be printed; display means with a display unit capable of displaying a plurality of characters upon receipt of display dot image data; tape width detecting means for detecting the width of the tape used; check data generating means for operating, whenever character data is stored into the data storing means, to compose dot image data for print area check which is similar to print dot image data, on the basis of the character data held in the data storing means, of the data stored in the font storing means, and of the character size data set by the format setting means; and first area judging means for operating, whenever the dot image data for print area check is updated, to judge whether printing is available within a print area of the tape, on the basis of the dot image data for print area check and of the tape width data detected by the tape width detecting means, whereby an error alarm is activated if the printing is judged to be unavailable within the print area.

The first area judging means may judge whether the presently stored character can be printed within a print area on the tape, the print area on the tape being determined dependently on the tape width of the tape.

The print format set in the format setting means may selectively set a tape length data within which the desired characters are to be printed, the set tape length and the tape width detected by the tape width detecting means determining the print area of the tape on which the desired characters are to be printed. The first area judging means may judge whether printing is available within the print area of the tape, on the basis of the image data for print area check, the detected tape width data, and the tape length data, if the tape length data is set by the format setting means.

According to another aspect, the present invention provides a tape printing apparatus for printing desired at least one character onto a tape, the apparatus comprising: input means for inputting at least one character desired to be printed on a tape and for inputting a command for printing when the input of the desired at least one character is completed; data storing means for temporarily storing data of the inputted at least one character; format setting means for setting a print format including a desired character size in which the inputted at least one character is to be printed on the tape; display font storing means for storing display pattern data for numerous characters inputtable by the input means for displaying; first display data generating means for reading display pattern data from the display font storing means for each of the characters stored in the data storing means and on the basis of the character size data set by the format setting means, thereby composing display image data for displaying images of the desired characters exactly as they are to be printed; display means for receiving the display image data from the first display data generating means and for displaying the desired at least one character; print font storing means for storing print pattern data of numerous characters inputtable by the input means for printing; tape width detecting means for detecting the width of the tape; check data generating means for reading, every time when data of each of the at least one character is stored into the data storing means, print pattern data from the print font storing means for each of the at least one character presently stored in the data storing means and on the basis of the character size data set by the format setting means, thereby producing image data for print area check for the presently stored character; first area judging means for judging whether the presently stored character can be printed on the tape on the basis of the image data for print area check and the tape width data detected by the tape width detecting means, every time when the image data for print area check is produced, to thereby indicate that the printing is unavailable if the printing is judged to be unavailable on the tape; print image data generating means for receiving the command for printing from the input means and for reading print pattern data from the font storing means for each of the desired at least one character completely stored in the data storing means and on the basis of the character size data set by the format setting means, thereby composing print image data for the desired at least one character; and print means for receiving the print image data for the desired at least one character and for printing the desired at least one character onto the tape.

BRIEF DESCRIPTION OF THE DRAWINGS

The above and other objects, features and advantages of the invention will become more apparent from reading the following description of the preferred embodiment taken in connection with the accompanying drawings in which:

FIG. 5 is a view listing typical contents of the printable range table;

FIG. 6 is a view indicating typical contents of the character size conversion table;

DETAILED DESCRIPTION OF THE PREFERRED EMBODIMENT

Figure 1:
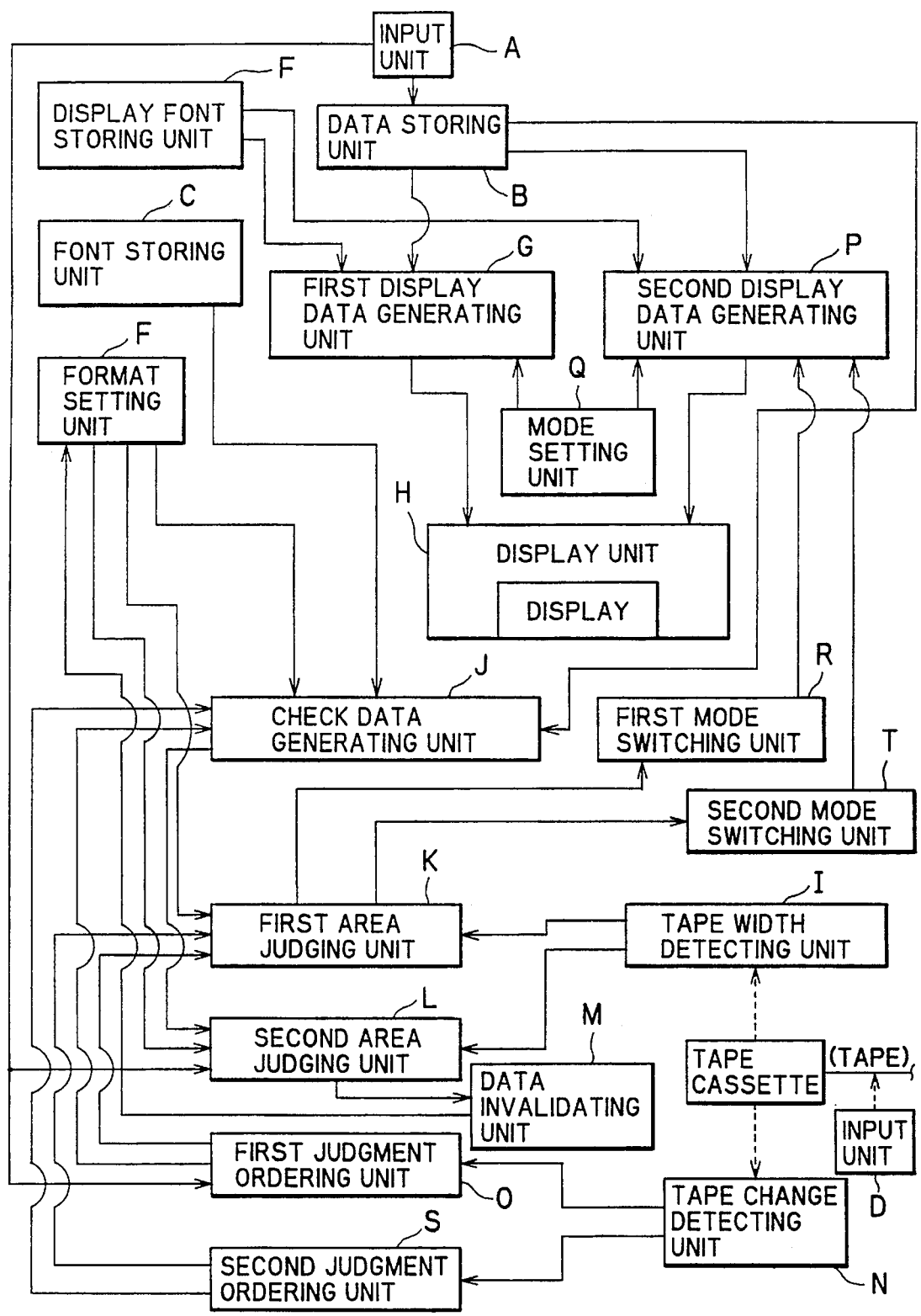
FIG. 1 is a function block diagram showing the constitution of the tape printing apparatus of an embodiment of the present invention.

A tape printing apparatus according to a preferred embodiment of the present invention will be described while referring to the accompanying drawings wherein like parts and components are designated by the same reference numerals to avoid duplicating description.

The tape printing apparatus is capable of both displaying input text data in print-like images and of continuously judging whether printing is available within the print area of a tape even as text data is being input, and which is capable of providing both a conventional text display function and a print image display function.

The tape printing apparatus of the present embodiment will be schematically described below with reference to FIG. 1.

As shown in FIG. 1, the tape printing apparatus of the present embodiment includes: an input unit A for inputting various characters and commands; a data storing unit B for storing data of the input characters; a font storing unit C for storing font data of either the outlines or the dot patterns of numerous characters; a print unit D for printing characters onto a tape which is used as a print medium; a format setting unit E for setting a print format including a character size and a tape length for printing of the characters; a display font storing unit F for storing display dot pattern data of numerous characters; a first display data generating unit G for reading display dot pattern data from the display font storing unit F for each of the characters stored in the data storing unit B and on the basis of the character size data set by the format setting unit E, thereby composing display dot image data for displaying images of the inputted characters exactly as they are printed; a display unit H with a display capable of displaying a plurality of characters upon receipt of display dot image data; a tape width detecting unit I for detecting the width of the tape used as the print medium; a check data generating unit J used, whenever character data is stored into the data storing unit B, for composing dot image data for print area check which is similar to print dot image data, on the basis of the character data held in the data storing unit B, of the data stored in the font storing unit C, and of the character size data set by the format setting unit E; and a first area judging unit K used, every time when the check data is updated in the check data generating unit J, for judging whether printing is available within the print area of the tape, on the basis of the updated check data, of the tape width data detected by the tape width detecting unit I, and of the tape length data if a tape length is set by the format setting unit E, whereby an error alarm is activated if the printing is judged to be unavailable within the print area.

With the above structure, the character data input through the input unit A is stored in the data storing unit B. Every time when character data is placed into the data storing unit B, the check data generating unit J composes the dot image data for print area check which is similar to print dot image data, on the basis of the character data held in the data storing unit B, of the data stored in the font storing unit C, and of the character size data set by the format setting unit E. At this point, every time when the dot image data for print area check is updated, the first area judging unit K judges whether printing is available within the print area of the tape on the basis of the updated check data, of the tape width data detected by the tape width detecting unit I, and of the tape length data if a tape length is set by the format setting unit E. An error alarm is activated if the printing is judged to be unavailable within the print area. If the printing is judged to be available, the first display data generating unit G reads from the display font storing unit F the display dot pattern data for each of the characters held in the data storing unit B and on the basis of the character size data set by the format setting unit F, thereby composing display dot image data for print-like image display. Given the display dot image data, the display unit H displays a plurality of characters on the display unit.

Every time character data is input, the dot image data for print area check which is similar to the print dot image data is composed. The dot image data for print area check is used to judge whether printing is available within the print area of the tape. An activated error alarm warns of the unavailability of printing if that is the case, so that only printable data is stored in the data storing unit B. This eliminates the need for extra editing work such as modifications of text data or print format information upon printing, whereby the print process is simplified.

The tape printing apparatus further includes: a second area judging unit L used, whenever the print format is changed by the format setting unit E during input of a series of characters, for causing the check data generating unit J to update the dot image data for print area check and for judging whether the printing is available within the print area of the tape on the basis of the updated check data, of the tape width data detected by the tape width detecting unit I, and of the tape length data if a tape length is set by the format setting unit E, whereby an error alarm is activated if the printing is judged to be unavailable within the print area; and a data invalidating unit M used, if the second area judging unit L judges the printing to be unavailable, for invalidating the change of the print format. Accordingly, only the printable format information can be set in accordance with the amount of the input text data and the width of the currently loaded tape.

The tape printing apparatus further includes: a tape change detecting unit N for detecting the change of a tape cassette containing the tape; and a first judgment ordering unit O for causing the check data generating unit J to update the dot image data for print area check when receiving from the tape change detecting unit N an output indicating the change of the tape cassette during input of a series of characters, and for causing the first area judging unit K to judge again whether the printing is available. Accordingly, at the time of text data input, it is possible to see whether or not the data may be printed onto the tape housed in the newly loaded tape cassette.

The tape printing apparatus further includes: a second display data generating unit P for reading display dot pattern data in a predetermined display size from the display font storing unit F for each of the characters stored in the data storing unit B, thereby composing display dot image data for displaying the characters in the predetermined display size; and a mode setting unit Q for selecting one of a first and a second display mode, the first display mode being one in which the first display data generating unit G operates, the second display mode being one in which the second display data generating unit P operates. With this structure, the input text data is displayed on the display unit in any one of the two display modes.

The tape printing apparatus further includes a first mode switching unit R for replacing the first display mode with the second display mode if the first area judging unit K judges the printing to be unavailable in the first display mode. Accordingly, it becomes possible to input the desired text data easily regardless of the availability of printing which is dependent on the amount of the data.

The tape printing apparatus further includes: a second judgment ordering unit S for causing the check data generating unit J to update the dot image data for print area check when receiving from the tape change detecting unit N an output indicating the change of the tape cassette during input of a series of characters, and for causing the first area judging unit K to judge again whether the printing is available. This makes it possible, at the time of text data input, to see whether or not the data may be printed onto the tape housed in the newly loaded tape cassette.

The tape printing apparatus further includes: second mode switching unit T for replacing the first display mode with the second display mode if the first area judging unit K, when activated by order from the second judgment ordering unit S, again judges the printing to be unavailable in the first display mode. This makes it possible to input the desired text data easily regardless of the availability of printing which is dependent on the width of the tape.

The mode setting unit Q causes the first area judging unit K to judge whether the printing is available when the second display mode is to be replaced by the first display mode, and selects the first display mode only if the first area judging unit K judges the printing to be available. This allows the second display mode to be replaced by the first displayed mode when all print conditions for permitting printing within the print area of the tape are met.

A concrete example of the tape printing apparatus of the present invention will be described below with reference to FIGS. 2 through 20.

In the concrete example, the present invention is applied to a tape printer capable of printing various characters such as alphanumeric letters and symbols onto a print tape.

Figure 2:
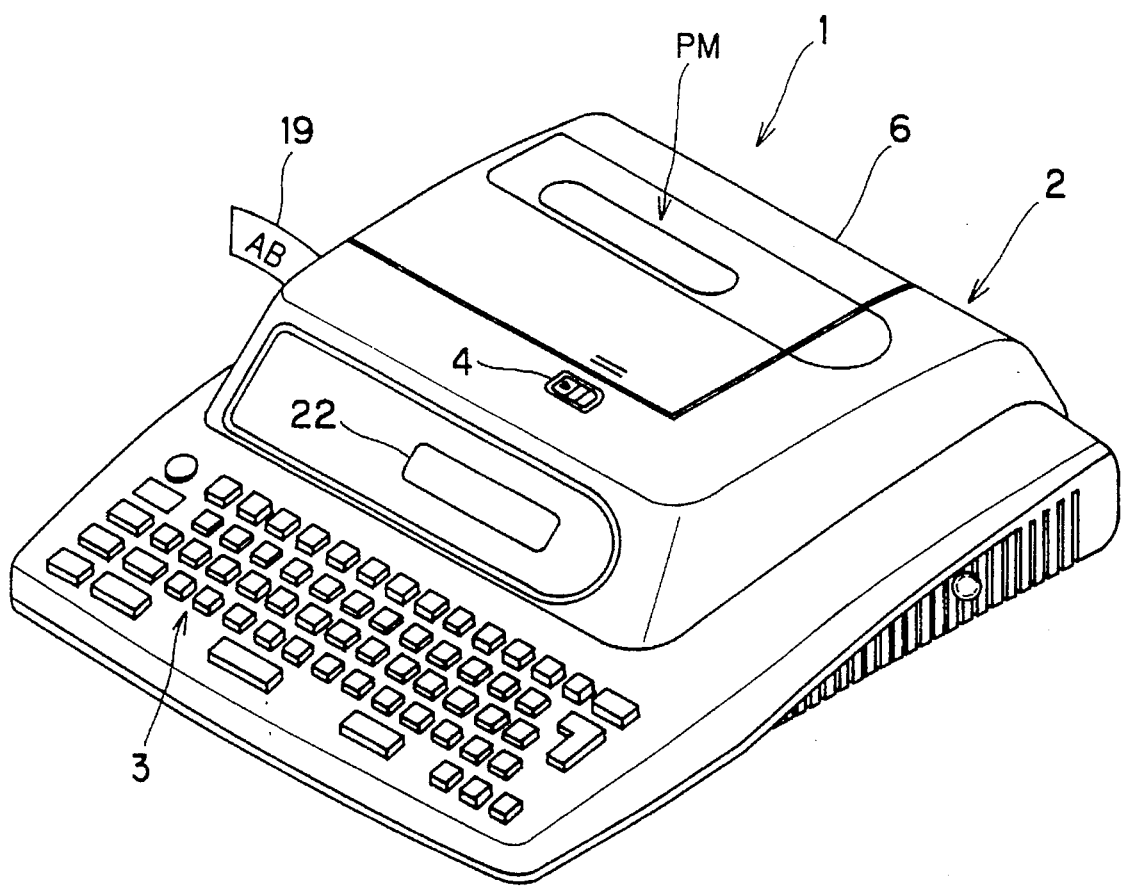
FIG. 2 is a perspective view of a tape printer according to a concrete example of the present invention.

As shown in FIG. 2, in a tape printer according to a concrete example of the present invention, a keyboard 3 is disposed in front of a body frame 2 of a tape printer 1, a printing mechanism PM is provided at the rear of the keyboard 3 and within the body frame 2, and a liquid crystal display 22 capable of displaying inputted characters as print-like images is disposed just behind the keyboard 3. The display unit 22 has a screen composed of 32 dots in the vertical direction high and 121 dots in the horizontal. A release button 4 is provided for opening a cover frame 6 when a tape containing cassette CS is to be loaded in or removed from a printing mechanism PM.

On the keyboard 3 there are arranged a variety of keys as character keys for inputting characters of a desired text to be printed; a space key; a return key; cursor moving keys for moving a cursor K horizontally and vertically on the display 22; format setting keys for changing and setting format information including the size of characters to be printed and the tape length within which the characters are to be printed in the longitudinal direction of the tape, a display mode switching key for setting either a text display mode in which to display input text characters in a predetermined display size or a print image display mode in which to display the input text characters in print-like images, an enter key for entering each of various setting processes, a print key for commanding printing operation; and a power key for turning power on and off.

The printing mechanism PM will be described in detail while referring to FIG. 3A. The rectangular, tape containing cassette CS is removably loaded in the printing mechanism PM. Within the tape containing cassette CS, there are rotatably provided a tape spool 8 around which a transparent laminate film 7 is wound; a ribbon supply spool 10 around which a print ribbon 9 is wound; a take-up spool 11 for taking up the print ribbon 9; a supply spool 13 around which a double coated tape 12 with the same width as the laminate film 7 is wound with its peel-off paper on the outside; and a joining roller 14 for adhering the double-coated tape 12 to the laminate film 7. The double-coated tape 12 includes a base tape, on both sides of which are formed adhesive layers, and a peel-off paper attached to the adhesive layer on one side of the base tape.

A thermal head 15 is installed upright in the position where the laminate film 7 and the print ribbon 9 overlap each other. A platen roller 16, for pressing the laminate film 7 and the print ribbon 9 against the thermal head 15, and a feed roller 17, for pressing the laminate film 7 and the double coated tape 12 against the joining roller 14 to thereby form the print tape 19, are pivotally supported for rotation on a support member 18 which is pivotally rotatably mounted on the body frame 2. On the thermal head 15, there is provided a group of heating elements formed of a train of 128 heating elements arranged in the vertical direction.

Accordingly, when electric current is passed through the heating elements while the joining roller 14 and the take-up spool 11 are driven in their predetermined rotation directions in synchronism with each other by rotation of a tape feed motor 45 (refer to FIG. 4) in its predetermined rotating direction, characters are printed on the laminate film 7 using plural trains of dots. Then, the double coated tape 12 is attached to the laminate film 7 and the tape is fed, as the print tape 19, in the tape feeding direction A to be discharged from the body frame 2 as shown in FIGS. 2 and 3. Details of the printing mechanism PM are described in U.S. Pat. No. 5,188,469, the disclosure of which is hereby incorporated by reference.

Figure 3A:
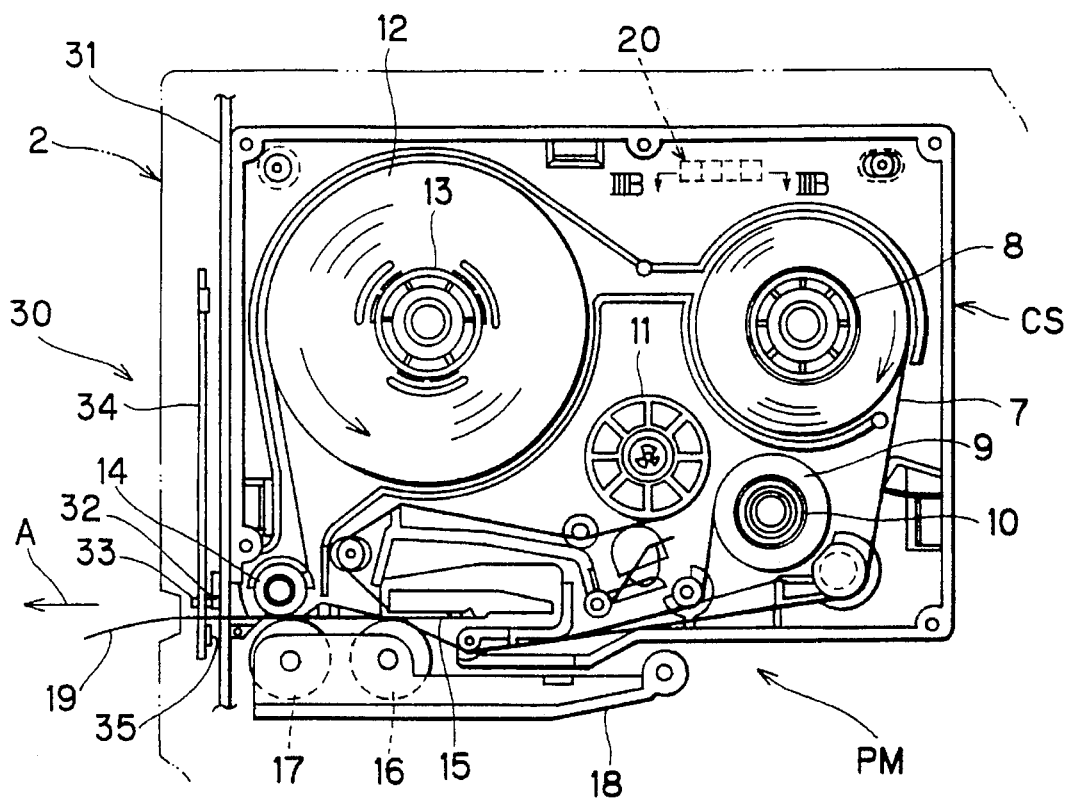
FIG. 3A is a schematic plan view of a print mechanism employed in the tape printer, with a tape cassette loaded therein.

Referring to FIG. 3A, a manual cutting mechanism 30 for cutting the print tape 19 will be described in detail below.

Just inside the body frame 2, there is provided a plate-formed auxiliary frame 31 in an upright posture and a stationary blade 32 that is fixedly attached to the auxiliary frame 31 so as to face in an upward direction. An operating lever 34 extended in the direction from front to rear is rotatably supported at its portion closer to the front end of the tape printer on a pivot shaft 33 that is fixedly attached to the auxiliary frame 31. A movable blade 35 is fixedly attached to the operating lever 34 in front of the pivot shaft 33 such that it opposes the stationary blade 32. The rear end portion of the operating lever 34 is structured so as to be vertically swingable via a swing drive mechanism (not shown) that is coupled to a cutting motor 46 (see FIG. 4). Normally, the movable blade 35 is held apart from the stationary blade 32.

The print tape 19 having text printed thereon passes through the space between the stationary blade 32 and the movable blade 35 and sticks out of the body frame 2. Then, a cut signal drives the cutting motor 46 to cause the swing drive mechanism to vertically swing the rear end of the operation level 34. The swinging motion causes the moving blade 35 to approach the fixed blade 32 so as to cut the print tape 19.

The print tape 19 to be fed from the tape containing cassette CS (i.e., the double-coated tape 12 and the laminate film 7 mounted in the cassette CS) is provided in five different widths: 6 mm, 9 mm, 12 mm, 18 mm, and 24 mm. On the bottom wall of each tape containing cassette CS, there is provided a projecting piece 20. The projecting piece 20 formed on each tape cassette CS is for indicating a tape width of a tape 19 i.e., the width of the double-coated tape 12 and the laminate film 7 that are mounted in the cassette CS. Because the tape width is one of the five tape widths, the projecting piece 20 formed on each tape cassette CS is formed with four projecting claws for distinguishing in combination one from the five tape widths.

Figure 3B:
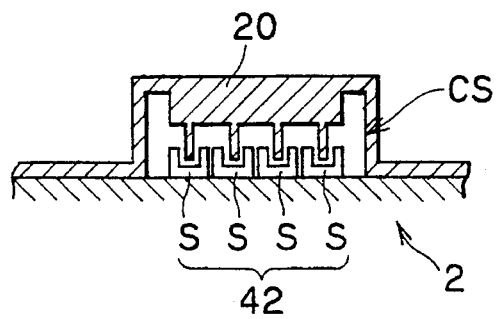
FIG. 3B is a schematic sectional view taken along a line IIIB—IIIB of FIG. 3A.

As shown in FIG. 3B, a cassette sensor 42 is provided on the body frame 2 at a position with which the projecting piece 20 of the tape cassette CS will be brought into confrontation when the tape cassette CS is loaded in the printing mechanism portion PM. The cassette sensor 42 is for detecting the condition of the projecting claws of the projecting piece 20 to thereby detect the tape width of a tape 19 housed in the tape cassette CS that is loaded in the printing mechanism portion PM.

The cassette sensor 42 is made from four photocouplers S, each having a light-emitting diode paired with a photodetector. Each of the four photocouplers is located at a position capable of receiving a corresponding projecting claw of the projecting piece 20. Each photosensor is therefore for detecting whether or not the corresponding projecting claw is inserted between the light-emitting diode and the photodetector. Illustratively, the cassette sensor 42 outputs a cassette signal TS "0100" for a tape width of 24 mm, a cassette signal TS "1100" for a tape width of 12 mm, or a cassette signal TS "0000" when not tape cassette CS is mounted.

Figure 4:
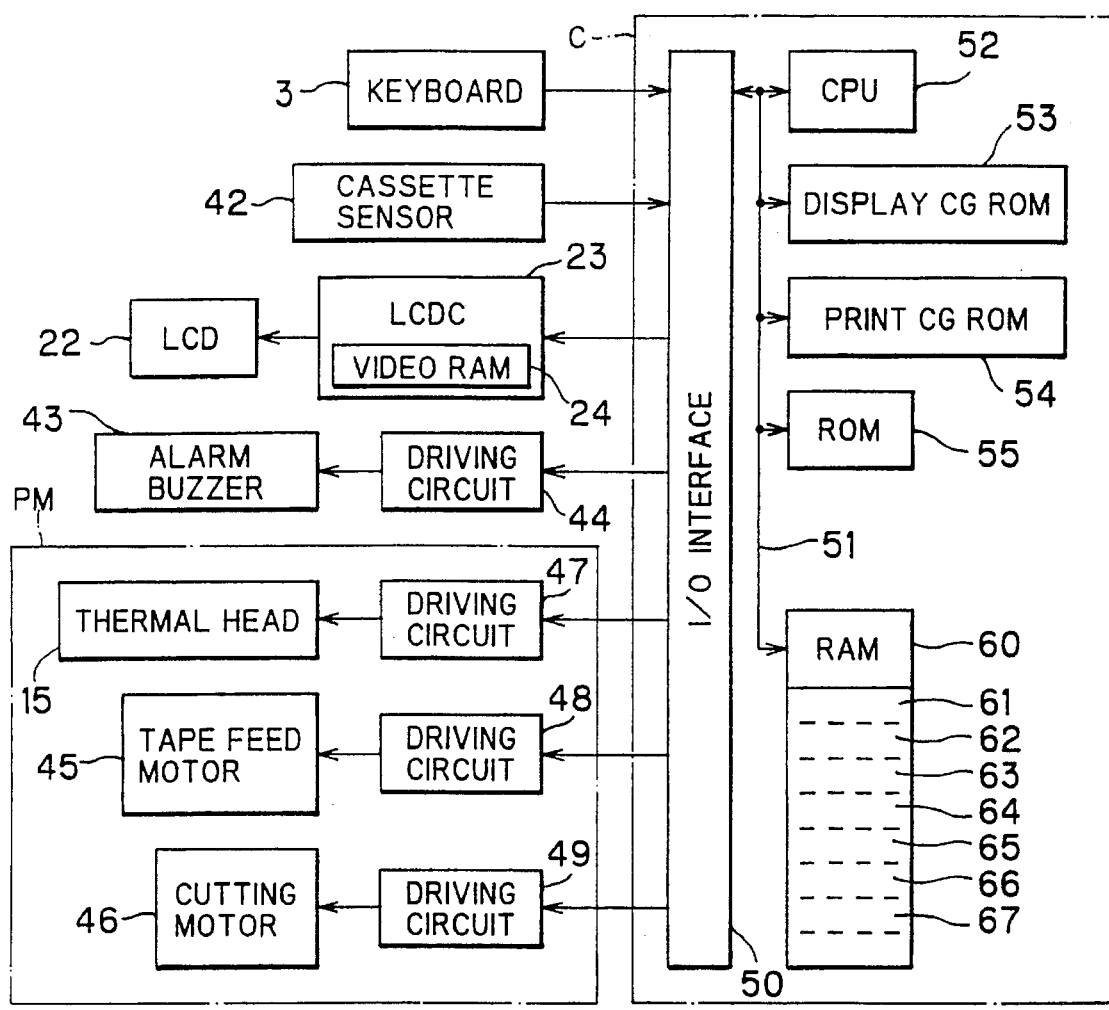
FIG. 4 is a block diagram of the control system in the tape printer.

The control system of the tape printing apparatus 1 is constituted as shown in the block diagram of FIG. 4.

A control unit C includes a CPU 52 and a I/O interface 50, a display CG (character generator) ROM 53, a print CG (character generator) ROM 54, a ROM 55 and a RAM 60 which are connected to the CPU 52 via a bus 51 such as a data bus.

The I/O interface 50 of the control unit C is connected to the keyboard 3; the cassette sensor 42; an LCD controller 23, with a video RAM 24, for outputting display data to the LCD unit 22; a driving circuit 44 for activating an alarm buzzer 43; a driving circuit 47 for driving the thermal head 15; a driving circuit 48 for driving the tape feed motor 45; and a driving circuit 49 for driving the cutting motor 46.

The display CGROM 53 stores display dot pattern data with respect to code data of each of a plurality of characters at each of six display character sizes (that is, 7, 10, 16, 21, 32, and 32 big dot) for each of a plurality of fonts (such as Gothic, Ming type, etc). The display character size defined as the 32 big dot is a display character size that allows display of certain characters, that do not extend below the character base line, at a size larger than the standard 32-dot character size. Capital alphabetic letters are an example of characters to which 32 big dot display character size can be applied.

The print CGROM 54 stores print dot pattern data with respect to code data of each of a plurality of characters at each of seven print character sizes (i.e., 6-point (16-dot), 10-point (24-dot), 13-point (32-dot), 19-point (48-dot), 26-point (64-dot), 38-point (96-dot), and 44-point (96-big-dot)) for each of the plurality of fonts. The display character size defined as 44-point (96-big-dot) size is a display character size that allows display of certain characters, that do not extend below the character base line, at a size larger than the standard 96-dot character size. Capital alphabetic letters are an example of characters to which 44-point (96-big-dot) print character size can be applied.

The ROM 55 contains a display drive control program; a print drive control program; and a tape print control program. The display drive control program controls the LCD controller 23 in response to the code data for the characters that are inputted from the keyboard 3. The print drive control program drives the thermal head 15 and tape feed motor 45 by consecutively retrieving data from a print data buffer 66. The tape print control program is specific to this invention and includes a print image display control routine for displaying text data in print-like images and a text display control routine for normal text display. The tape print control program will be described later in more detail.

The ROM 55 includes a printable range table TB1 and a character size conversion table TB2. The printable range table TB1, shown in FIG. 5, lists tape widths TW (mm) of the print tape 19 in conjunction with the corresponding printable widths PW (in dots). The character size conversion table TB2, shown in FIG. 6, lists print character sizes SZ in correspondence with display character sizes at which characters should be displayed in print-like image when characters are to be printed at the corresponding print character sizes.

The ROM 55 also contains a print character search table and a print character index table (both not shown). The print character search table lists seven print character sizes in correspondence with start addresses (index addresses) in the print CGROM 54 where print dot pattern data is stored for a series of characters for each of the seven print character sizes. The print character index table lists the above index addresses in correspondence with those start addresses in the print CG ROM 54 where various characters are stored.

Furthermore, the ROM 55 includes a display character search table and a display character index table (both not shown). The display character search table lists six display character sizes in correspondence with those start addresses (index addresses) in the display CGROM 53 where display dot pattern data are stored about a series of characters for each of the six display character sizes. The display character index table lists the above index addresses in correspondence with those start addresses in the display CG ROM 53 where various characters are stored.

A text memory 61 in the RAM 60 accommodates text data input from the keyboard 3. A parameter memory 62 stores a start address pointer value SP for designating a start address in the text memory 61, an end address pointer value EP for designating an end address in the text memory 61, a data count value DC, print character size data SZ, set tape length data, and tape width data. A display character size memory 63 contains data about the selected display character size. A location data memory 64 stores data about the display locations in a display data buffer 65 regarding various characters to be displayed and data about the print locations in a print data buffer 66 regarding various characters to be printed. The display data buffer 65 accommodates composed display dot pattern data about a plurality of inputted characters. The print data buffer 66 contains composed print dot pattern data about a plurality of characters to be printed. A flag memory 67 accommodates three kinds of flag data, a cassette change flag CF, a display mode flag DF, and a print error flag EF. The cassette change flag CF is set (to "1") when the tape cassette is changed. The display mode flag DF is set when the print image display mode is selected and reset when the text display mode is selected. The print error flag EF is set if a print-disabling error is occurred.

The tape print control routine executed by the control unit C of the tape printing apparatus 1 will be described below with reference to the flowcharts in FIGS. 7 through 12. In the figures, Si (i=10, 11, 12, etc.) represents individual steps.

Operating the power key on the keyboard 3 starts the control routine. Starting the routine clears the memories 61 through 66 in the RAM 60 and initializes the print mechanism PM. After this, the display mode flag DF is set to select the print image display mode. Of the tape print control features, a print image display control routine is thus started preferentially (S10).

The cassette signal TS is read from the cassette sensor 42. On the basis of the cassette signal TS and the printable range table TB1, the number of printable dots corresponding to the width of the print tape 19 housed in the currently loaded tape cassette CS is placed into the parameter memory 62 (S11).

Then, the first two bytes of the text memory 61 are loaded with a standard format information (S12). The LCD unit 22 displays a print image display screen having a display area commensurate with the current tape width. This screen includes a cursor K whose size is the same as the display character size corresponding to the print character size defined by the standard format information (S13). In the example shown in FIG. 13, the standard format information stored in the first two bytes of the text memory 61 includes "Ming type" for the font number data FN, "44 pt (points)" for the print character size SZ, and "no setting" for the set tape length, etc.

A print image display process is then carried out, whereby the characters presently held in the text memory 61 are displayed in print-like images (S14). This process will be discussed later in more detail.

When the tape cassette CS remains unchanged ("NO" in S15) and when some format setting key is operated (i.e., S16 and S17 are YES), then a format information setting process is carried out (S21). In this process, the newly set format information is placed temporarily in a work memory of the RAM 60. Of the newly set format information, the set tape length and the print character size SZ are stored in the parameter memory 62 (S21). During this format information setting process, the LCD unit 22 displays a format setting screen in which all format settings including the print character size, font name, and tape length may be designated. With the format setting screen displayed, the cursor move keys are operated to set the cursor consecutively at positions on the screen for setting print character size, font name, and tape length. At each item to which the cursor is set, appropriate numeric keys are operated to enter the desired setting, after which the enter key is pressed. This causes the format information including the numerically set print character size data SZ and tape length data to be stored in the work memory as updated format information. For example, the print character sizes that may be set and their corresponding setting numbers are "1" for 6 pt, "2" for 10 pt, "3" for 13 pt, "4" for 19 pt, "5" for 26 pt, "6" for 38 pt, and "7" for 44 pt.

Figure 8:
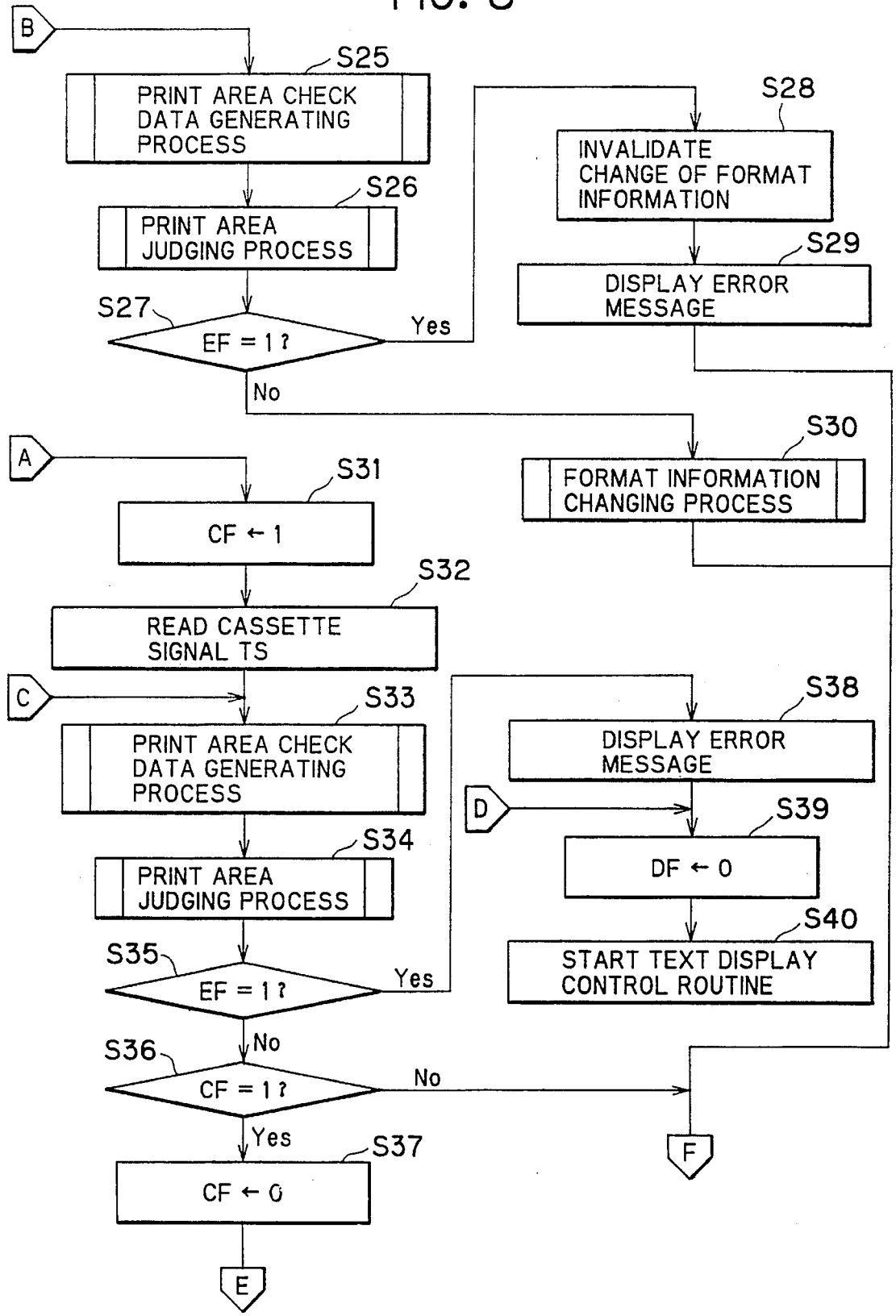
FIG. 8 is a flowchart illustrating a rest part of the print image display control routine.
Figure 9:
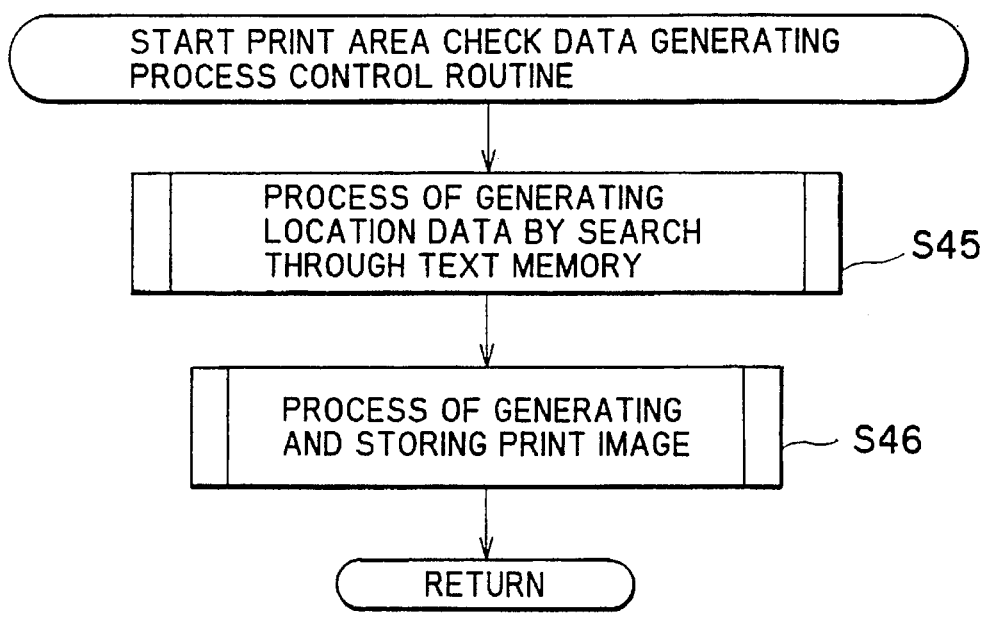
FIG. 9 is a flowchart illustrating a print area check data generating process control routine.

A print area check data generating process control routine is then carried out in S25, as shown in FIG. 8. As shown in FIG. 9, when this control routine is started, the text memory 61 is searched successively from the start address on for determining the locations in the print data buffer 66 where print dot pattern data for each of the characters to be printed should be developed based on the format information, character codes, and return codes. The location data is placed into the location data memory 64 (S45).

The text memory 61 is again searched from the start address on to carry out a print image generating process and a print image storing process. The print image generating process involves generating print images by reading from the print CG ROM 54 the print dot pattern data about the characters stored in the text memory at the print character size designated by the format information. The print image storing process is a process that stores the print dot pattern data into the print data buffer 66 as designated by the location data (S46). S46 is followed by a return to S26 of the print image display control routine.

Figure 10:
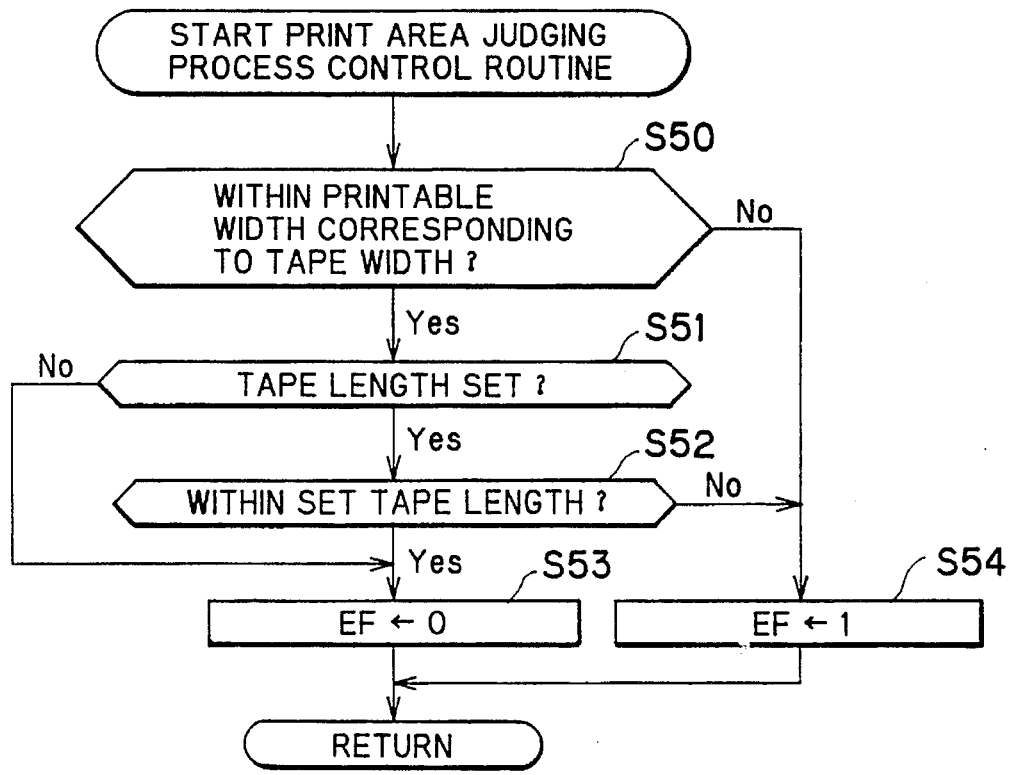
FIG. 10 is a flowchart illustrating a print area judging process control routine.

With the print image display control routine in operation, a print area judging process control routine is then performed in S26 to judge whether or not printing is available within the print area of the print tape 19. As shown in FIG. 10, when this control routine is started, a check is made to judge whether the print dot pattern data falls within the printable width PW commensurate with the tape width, on the basis of the tape width data in the parameter memory 62 and of the print dot pattern data in the print data buffer 66. If the result of this check is affirmative ("YES" in S50), two more checks are made to judge whether the tape length data is set in the parameter memory 62 and whether the print dot pattern data falls within the set tape length. If the results of the two checks are both affirmative ("YES" in S51 and S52), then the print error flag EF is reset (S53) since printing is available within that print area of the print tape 19 which is defined by the printable width PW (traverse direction) and by the set tape length (longitudinal direction).

If any tape length data is not set ("NO" in S51), the print error flag EF is also reset (S53). After this print area judging process control routine is finished, control returns to S27 of the print image display control routine in FIG. 8. If the print dot pattern data in the print data buffer 66 fails to comply with either the printable width PW or the set tape length ("NO" in S50 or S52), then the print error flag EF is set (S54) since printing is unavailable within the print area of the print tape 19. Then with the print area judging process control routine terminated, control returns to S27.

Figure 13:
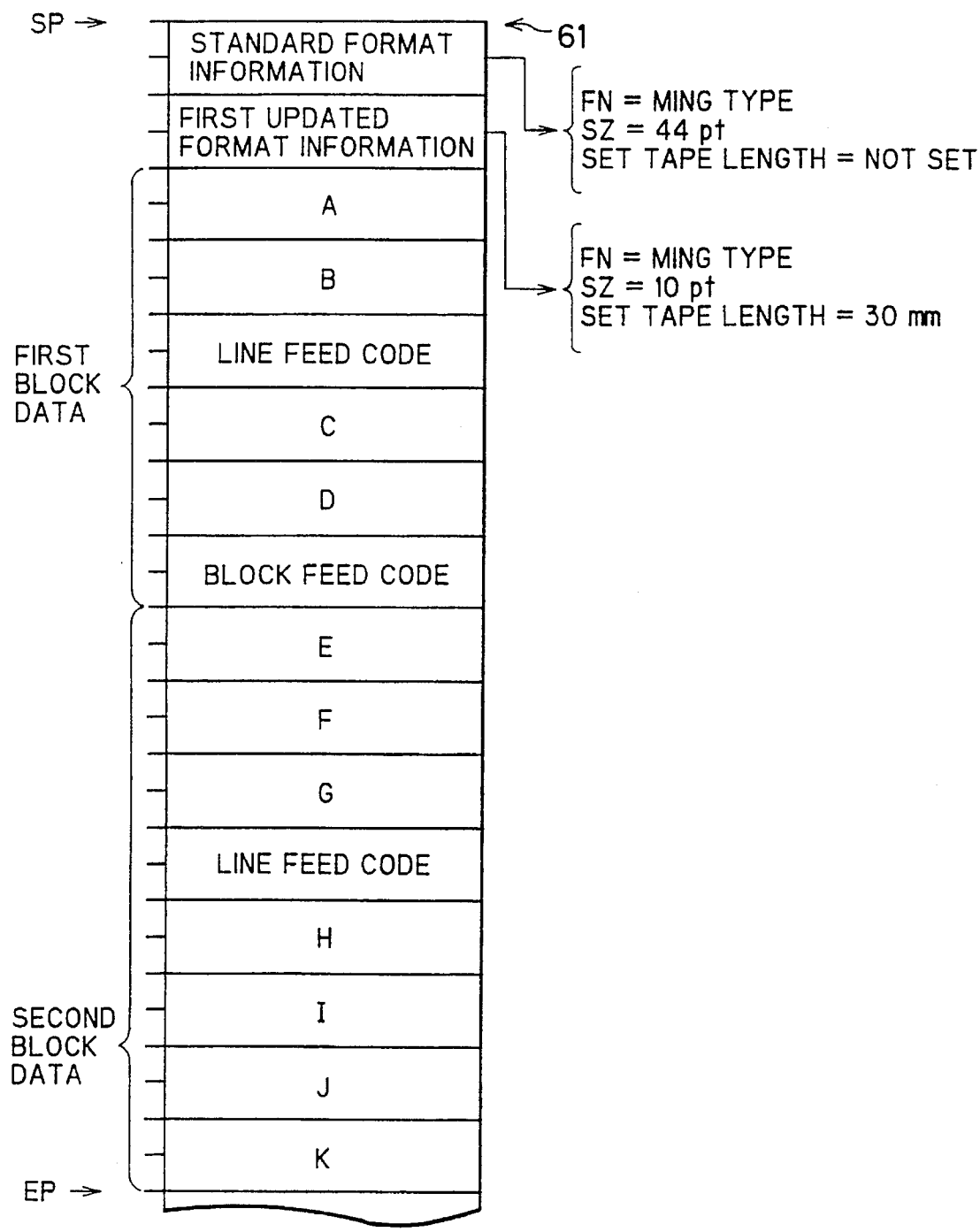
FIG. 13 is a view illustrating how a plurality of format information items and character string codes are stored in the text memory.

When the print error flag EF is reset under print image display control ("NO" in S27), the new format information set and held temporarily in the work memory of the RAM 60 is stored into the text memory 61 as the updated format information, and the newly set tape length and print character size data SZ are placed into the parameter memory 62 (S30). S30 is followed by S15 via S14. For example, as shown in FIG. 13, assume that the print character size SZ is changed to "10 pt" and the tape length to "30 mm" before the input of text data is completed. In that case, first updated format information including the changed settings is stored into two bytes subsequent to the standard format information within the text memory 61.

On the other hand, if the print error flag EF is set ("YES" in S27), any change in the format information is invalidated (S28), as will be discussed later. A message regarding this error is displayed on the LCD unit 22 (S29), and S15 is reached again. At this point, the alarm buzzer 43 may be activated at the same time as the display of the message.

If any of the printable character keys such as alphabetical letter keys, symbol keys and numeric keys is operated ("NO" in S15, "YES" in S16, "NO" in S17 "YES" in S18), a text data storing process is carried out whereby the code data corresponding to the operated printable character key is placed into the text memory 61 as text data (S22). Then the print area check data generating process control routine is performed in the same manner as in S25 (S33), followed by the print area judging process control routine carried out in the same manner as in S26 (S34). For example, as shown FIG. 13, suppose that the text memory 61 accommodates the first updated format information, first block data composed of two character strings "AB" and "CD," and second block data made of two character strings "EFG" and "HIJK." In that case, on the basis of the updated format information, character codes, return codes and a block code, the location data for each of the characters A through K to be printed is obtained so as to develop their corresponding print dot pattern data into the print data buffer 66. The print dot pattern data for each of the characters A through K is placed into the print data buffer 66 as designated by the corresponding location data. If the print dot pattern data in the print data buffer 66 falls within that print range of the print tape 19 which is defined by the printable width PW and the set tape length, then the print error flag EF is reset. If the print dot pattern data fails to fall within the defined print range, the print error flag EF is set.

If the print error flag EF is reset ("NO" in S35) and if the cassette change flag CF is reset ("NO" in S36), S36 is followed by S15 via S14.

On the other hand, if the print error flag EF is set ("YES" in S35), an error message is displayed on the LCD unit 22 (S38), the display mode flag DF is reset so that the text display mode is selected (S39), and the text display control routine is started (S40).

Figure 11:
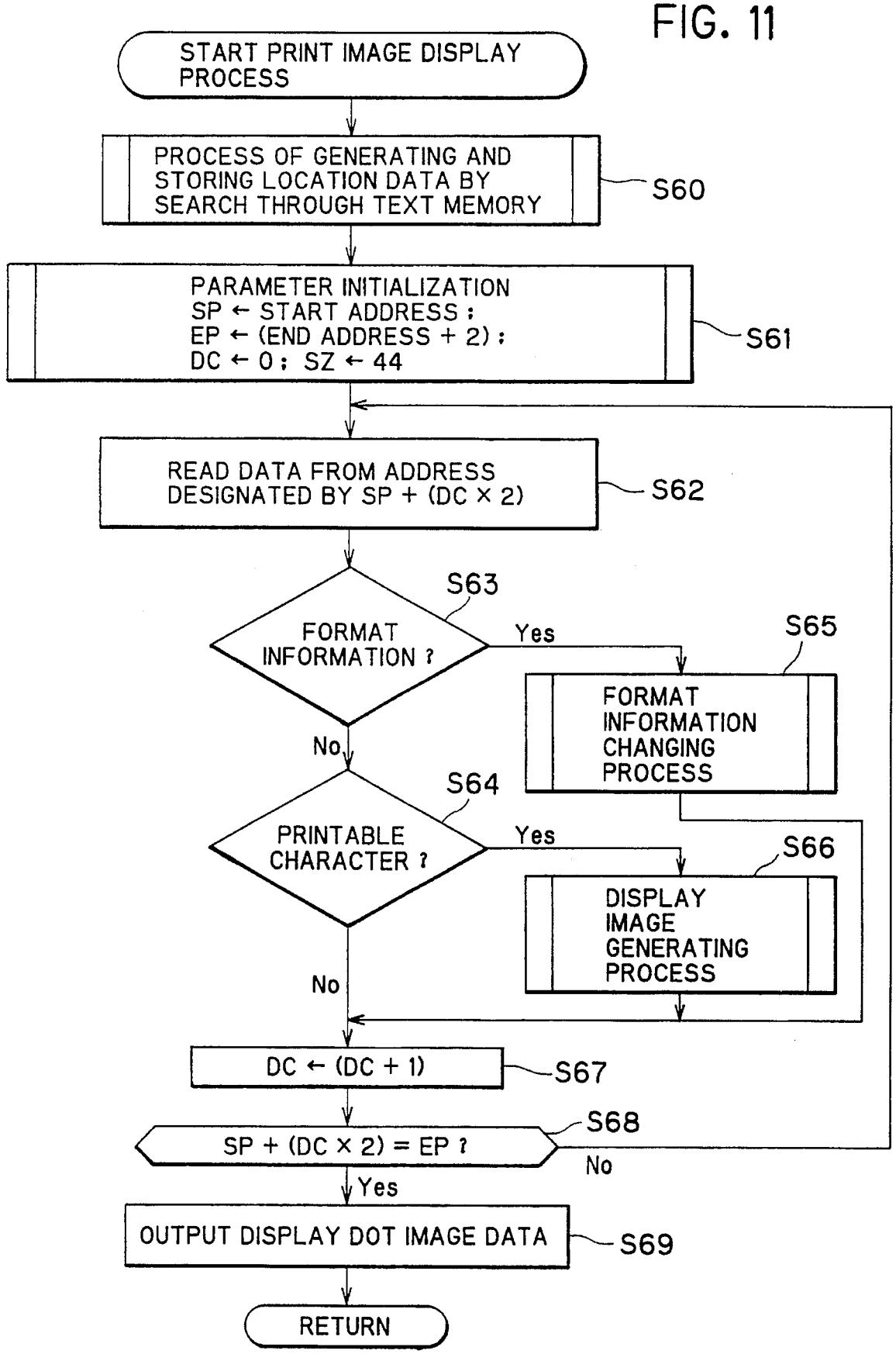
FIG. 11 is a flowchart illustrating a print image display control process.

The print image display process (S14) will now be described in detail with referring to FIG. 11. It is assumed that the text memory 61 presently stores the standard format information, the first updated format information, characters A through K, etc., as shown in FIG. 13.

When the print image display process is started, data in the text memory 61 is searched out successively from the start address. The locations in the display data buffer 65 where display dot pattern data for each of the characters to be displayed should be developed are determined based on the format information, character codes, and return codes. The location data is placed into the location data memory 64 (S60). The location data is determined illustratively as follows: the print locations of the characters are first obtained based on the format information, character codes, return codes, and print dot pattern data. The coordinates of the character locations are then multiplied by one third to determine the corresponding display locations.

Next, the parameter data in the parameter memory 62 is initialized for the print process (S61). That is, in the parameter memory 62, the start address of the text memory 61 is set as the start address pointer value SP (see FIG. 13); the address next to the end address of the text memory 61 (end address +2) is set as the end address pointer value EP (see FIG. 13); the initial value "0" is set for the data count value DC; and the size 44 pt is set for the print character size SZ.

Because the format information and the character code are each composed of two bytes, data, stored at the search address that is a sum of the start address and a value that is two times the data count value DC, is retrieved from the text memory 61 (S62). When the retrieved data is format information (i.e., YES in S63), a format information change process control routine is carried out whereby the print character size SZ and set tape length in the retrieved format information are stored into the parameter memory 62 (S65).

Then, the data count value DC is incremented by 1 (S67). If the search address, which is a sum of the start address pointer value SP and a value that is two times the data count value DC, fails to match the address designated by the end address pointer value EP, it can be judged that some display character exists in the text memory 61 (i.e., NO in S68), S62 and subsequent steps are repeatedly carried out.

If the data found at the searched address is a printable character code ("NO" in S63, "YES" in S64), a display image generating process is performed, whereby the display dot pattern data for this character code at the display character size defined by the print character size SZ and by the character size conversion table TB2 is read from the display CG ROM 53 and placed into the display data buffer 65 (S66). S66 is followed by S67.

Figure 7:
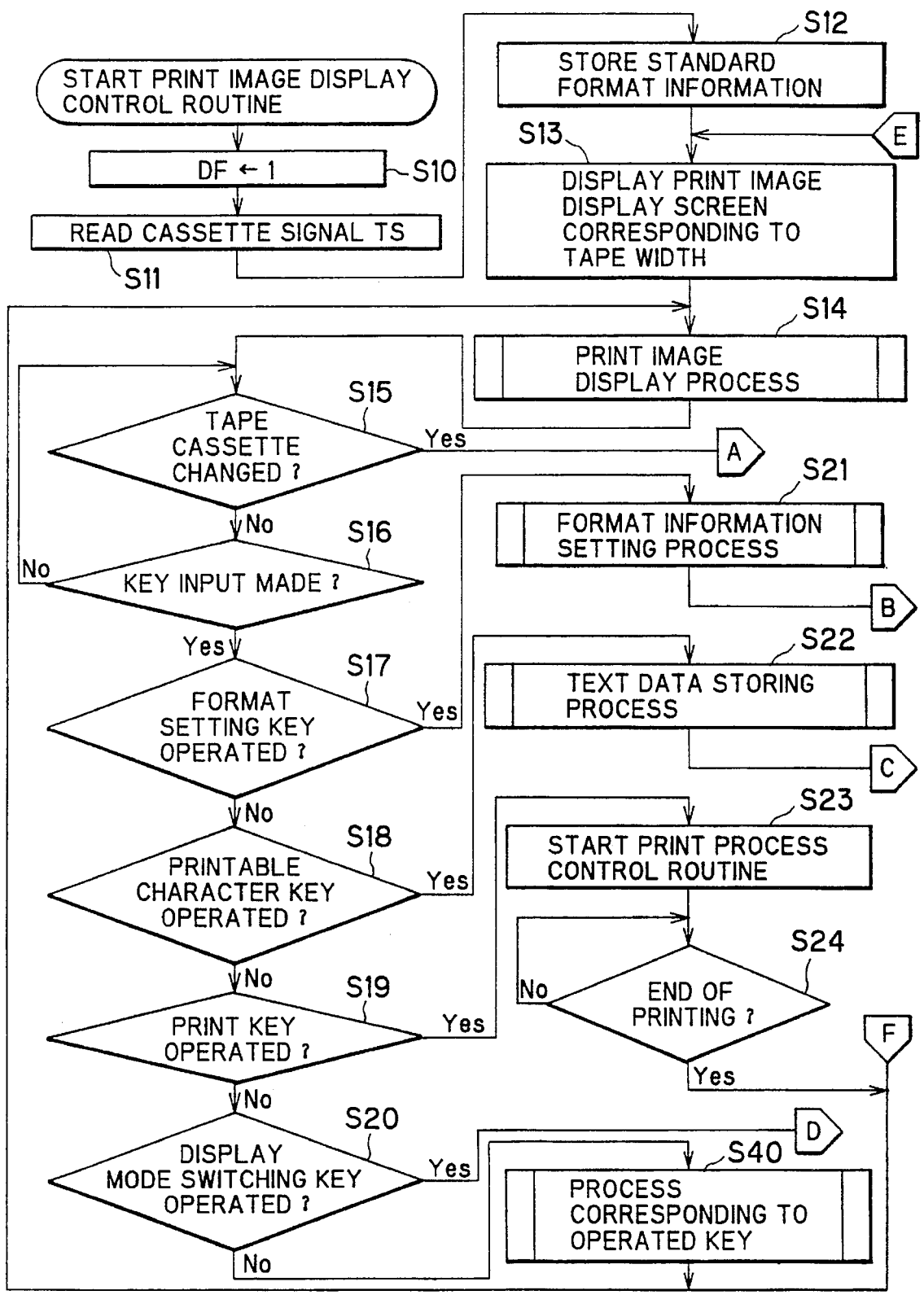
FIG. 7 is a flowchart illustrating a part of a print image display control routine.

If the searched address, which is a sum of the start address and a value that is two times the data count value DC, matches the address designated by the end address pointer value EP ("YES" in S68), then the display dot image data developed and stored in the display data buffer 65 is output to the video RAM 24 and displayed on the LCD unit 22 (S69). This terminates the print image display process (S14), followed by S15, as shown in FIG. 7.

Figure 17:
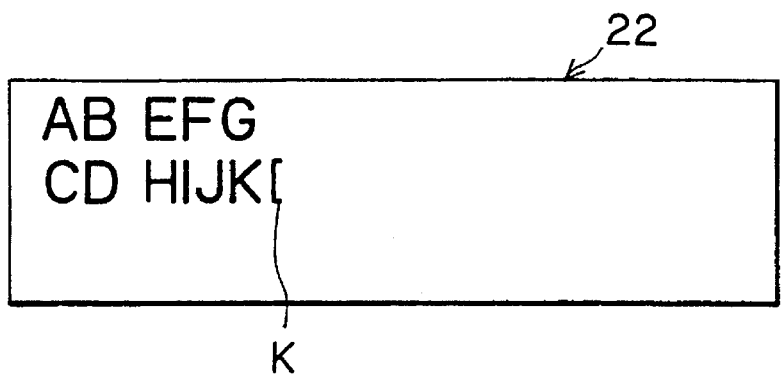
FIG. 17 is a view showing a typical image display screen which displays two lines of text data and which corresponds to the 24 mm wide tape.

For example, assume that the tape cassette CS houses a print tape 19 having a tape width of 24 mm and that the text memory 61 accommodates the format information and character code strings shown in FIG. 13. In that case, as shown in FIG. 17, the entire display area is used as a print image display screen corresponding to the 24 mm tape width. With this screen in effect, two character strings "AB" and "CD" of the first block and another two character strings "E–G" and "H–K" of the second block are displayed in print-like images on the LCD unit 22.

Figure 14:
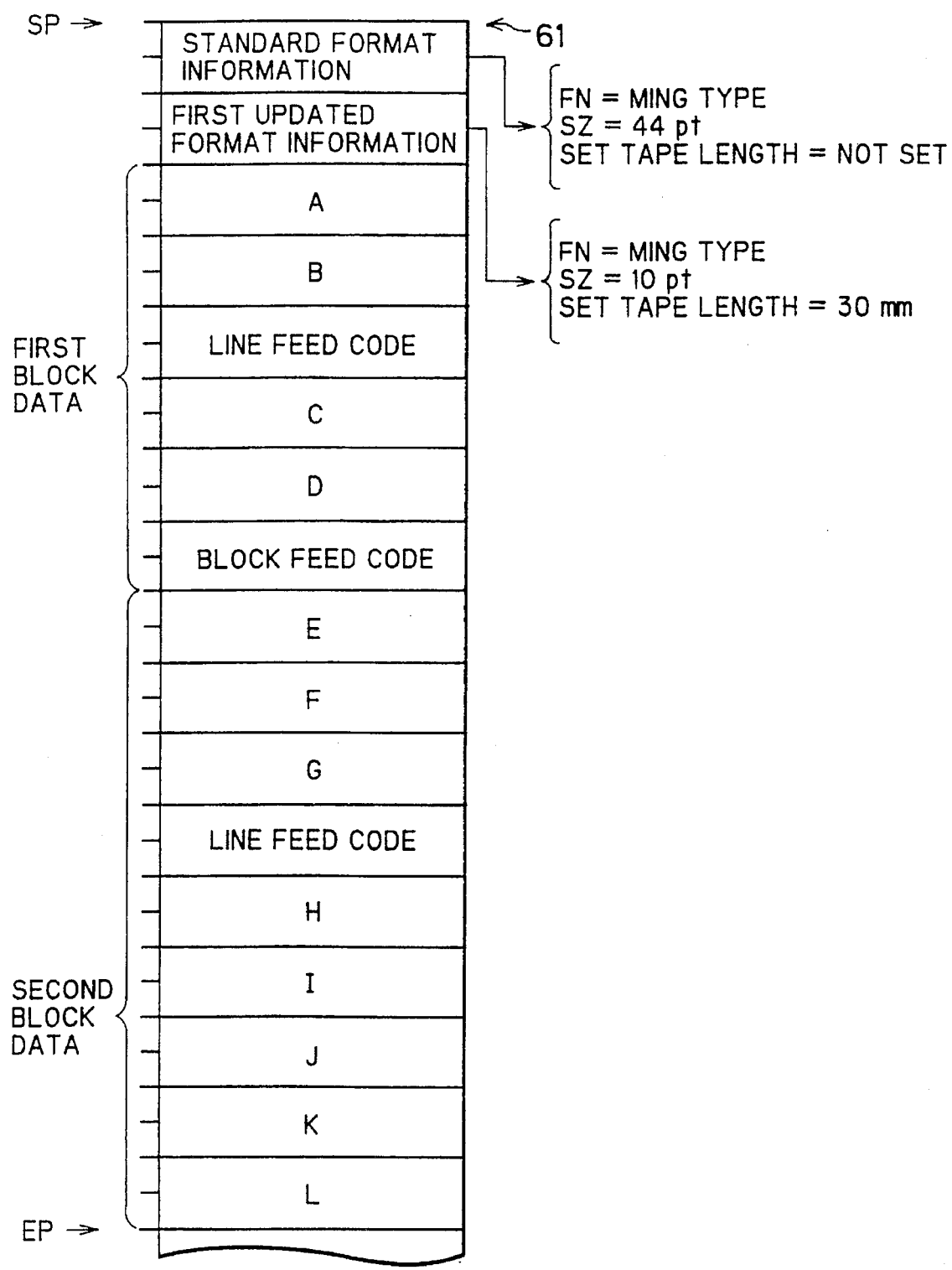
FIG. 14 is a view similar to FIG. 13 but supplemented by another character code.

Assume now that another character "L" is further input so that the code of the character "L" is added to and stored in the second line of the second block ("NO" in S15, "YES" in S16, "NO" in S17, "YES" in S18; S22) as shown in FIG. 14. In that case, the character string "H–L" is checked for print area availability. If the character string is found to exceed the set tape length of the print tape 19 (S33 and S34), the print error flag EF is set ("YES" in S35). A message about this error is displayed on the LCD unit 22 (S38). The display mode flag DF is reset and the text display mode is selected (S39). As a result, the text display control routine (FIG. 12) is started and the print image display control routine is stopped (S40).

Figure 12:
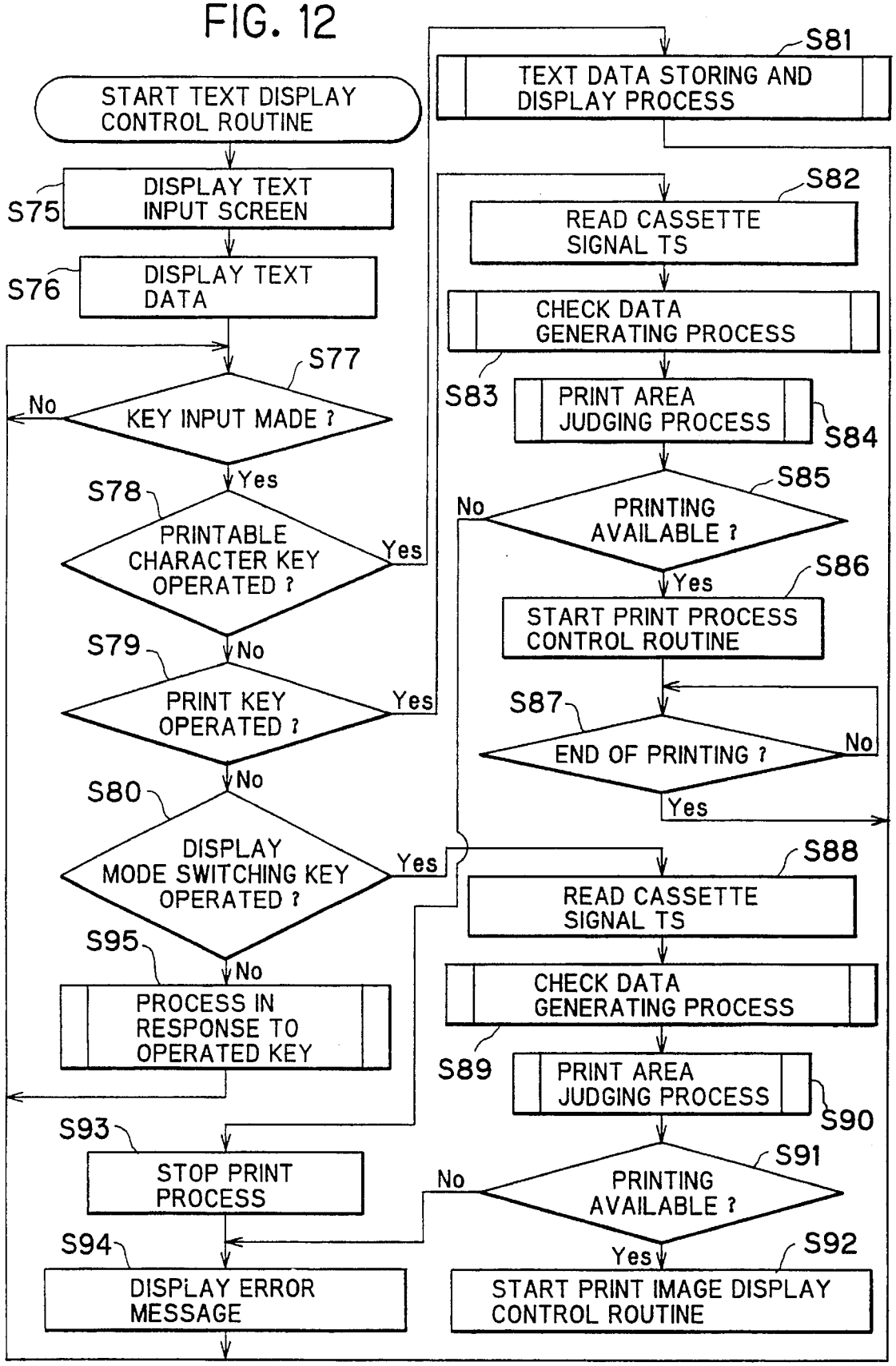
FIG. 12 is a flowchart illustrating a text display control routine.
Figure 20:
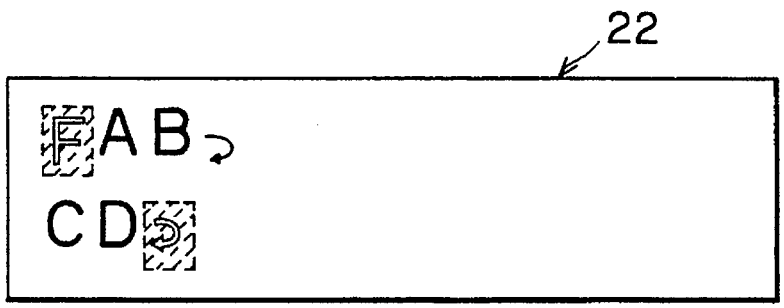
FIG. 20 is a view showing how text data is typically displayed in the text display mode.

As shown in FIG. 12, when the text display control routine is started, the normal text input screen is displayed on the LCD unit 22 (S75). The text data and control symbols read from the text memory 61 are displayed as display dot pattern data (S76) in a predetermined size (e.g., 16-dot character size). The routine then waits for the input of a key (S77). For example, if the text memory 61 contains the data shown in FIG. 13, the data on the first two lines out of the data on a plurality of lines designated by return codes or block codes is displayed on the text input screen as depicted in FIG. 20. In FIG. 20, the reversely-displayed character "F" denotes updated format information, and the reversely-displayed return symbol indicates a block code. The block codes are used to divide text data into blocks.

If the currently loaded tape cassette CS is removed from the print mechanism PM and replaced by a new tape cassette CS during input of text data under print image display control of FIG. 7, the cassette signal TS from the cassette sensor 42 is reset to 0 and then set to some value other than 0. When the change of the tape cassette CS is thus detected ("YES" in S15), the cassette change flag CF is set (S31) as shown in FIG. 8. The cassette signal TS at that time is then read in. On the basis of the cassette signal TS and the printable range table TB1, the number of printable dots corresponding to the tape width of the print tape 19 housed in the newly loaded tape cassette CS is placed into the parameter memory 62 (S32).

Figure 18:
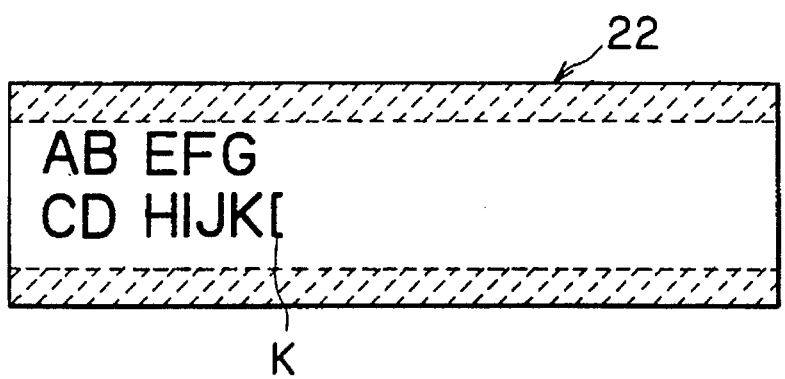
FIG. 18 is a view similar to FIG. 17 but corresponding to the 12 mm wide tape.

After S33 and S34 are executed, it may happen that the print error flag EF is not set ("NO" in S35). In that case (i.e., "YES" in S36), the cassette change flag CF is reset in S37. A print image display screen commensurate with the tape width is displayed on the LCD unit 22 (S13), the text data is displayed in print-like images (S14), and control returns to S15. For example, assume that the newly loaded tape cassette CS houses a print tape 19 with a tape width of 12 mm. In that case, as shown in FIG. 18, the LCD unit displays a print image display screen corresponding to the 12 mm wide tape, with the top and bottom margins of the screen reduced by four dots each. The text data shown in FIG. 13 is displayed on this screen.

Figure 15:
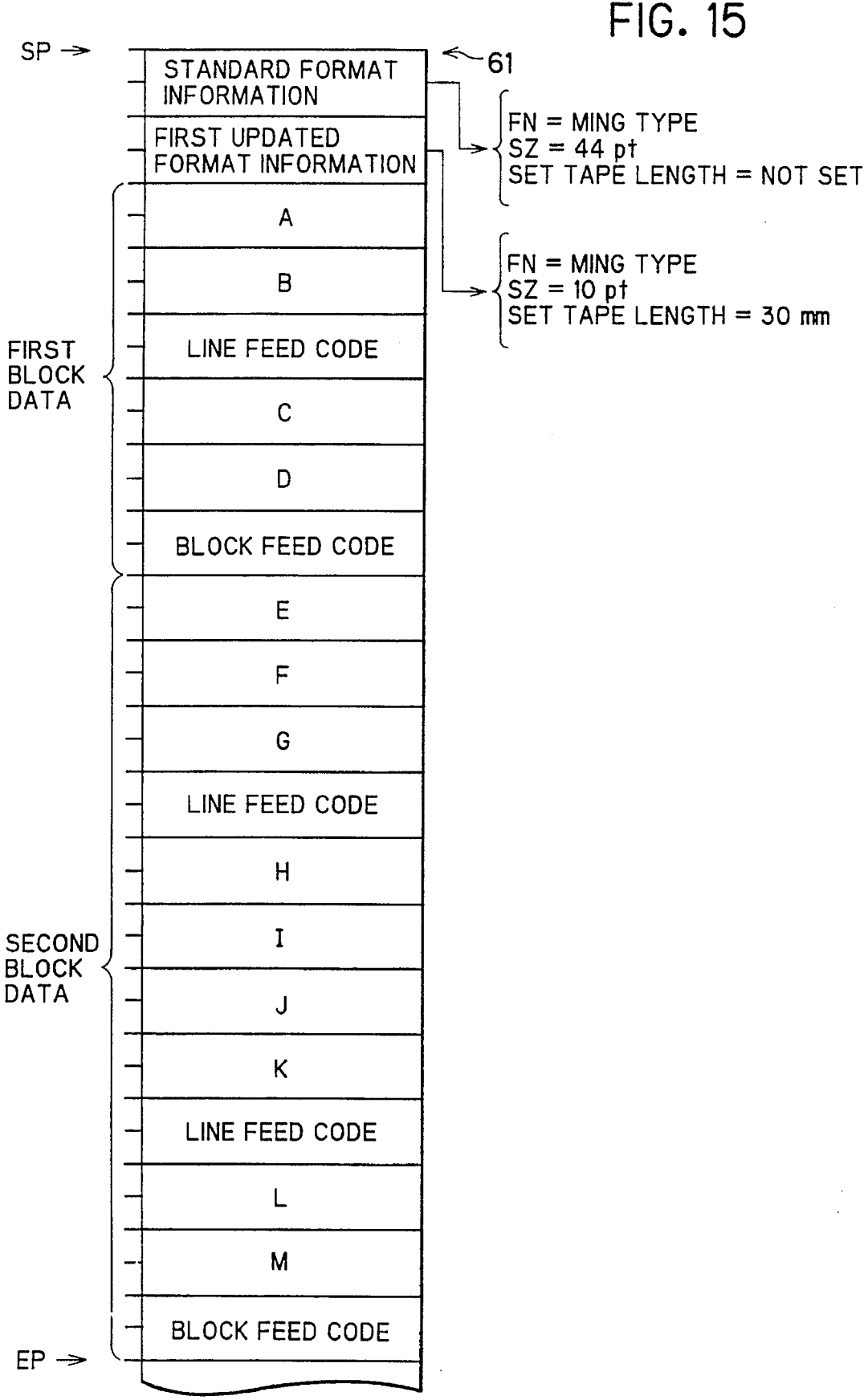
FIG. 15 is a view similar to FIG. 13 but supplemented by a further character code.
Figure 19:
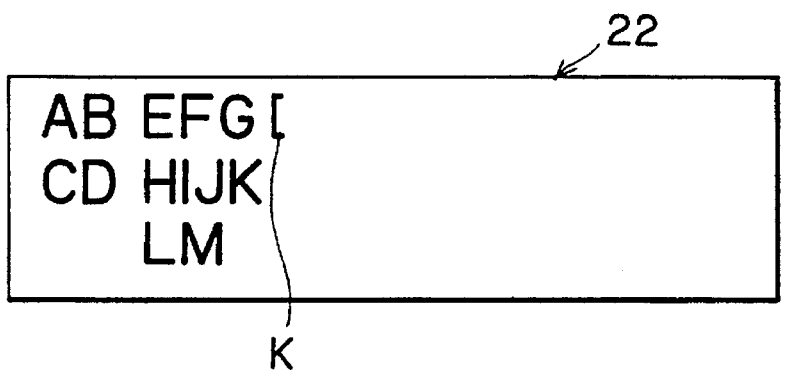
FIG. 19 is a view similar to FIG. 17 but displaying three lines of text data.

Assume now that when the character string "LM" is added as the third line of the second block as depicted in FIGS. 13 and 15 and the character strings "A–M" appear on the LCD unit 22 as shown in FIG. 19, a tape cassette CS housing a print tape 19 having the tape width of 12 mm is newly loaded ("YES" in S15). In that case, a check on the second block for print area availability reveals that the printable width of the print tape 19 is exceeded. That is, the print character size SZ of 10 pt (24 dots) results in 72 dots for the total height of three lines (S33 and S34), the 72 dot height being wider than the printable width of 56 dots for the 12 mm wide tape. With the print area of the print tape 19 thus exceeded, the print error flag EF is set ("YES" in S35). A message about this error is displayed on the LCD unit 22 (S38). The display mode flag DF is reset and the text display mode is selected (S39). The text display control routine is started, and the print image display control routine is stopped (S40).

Figure 16:
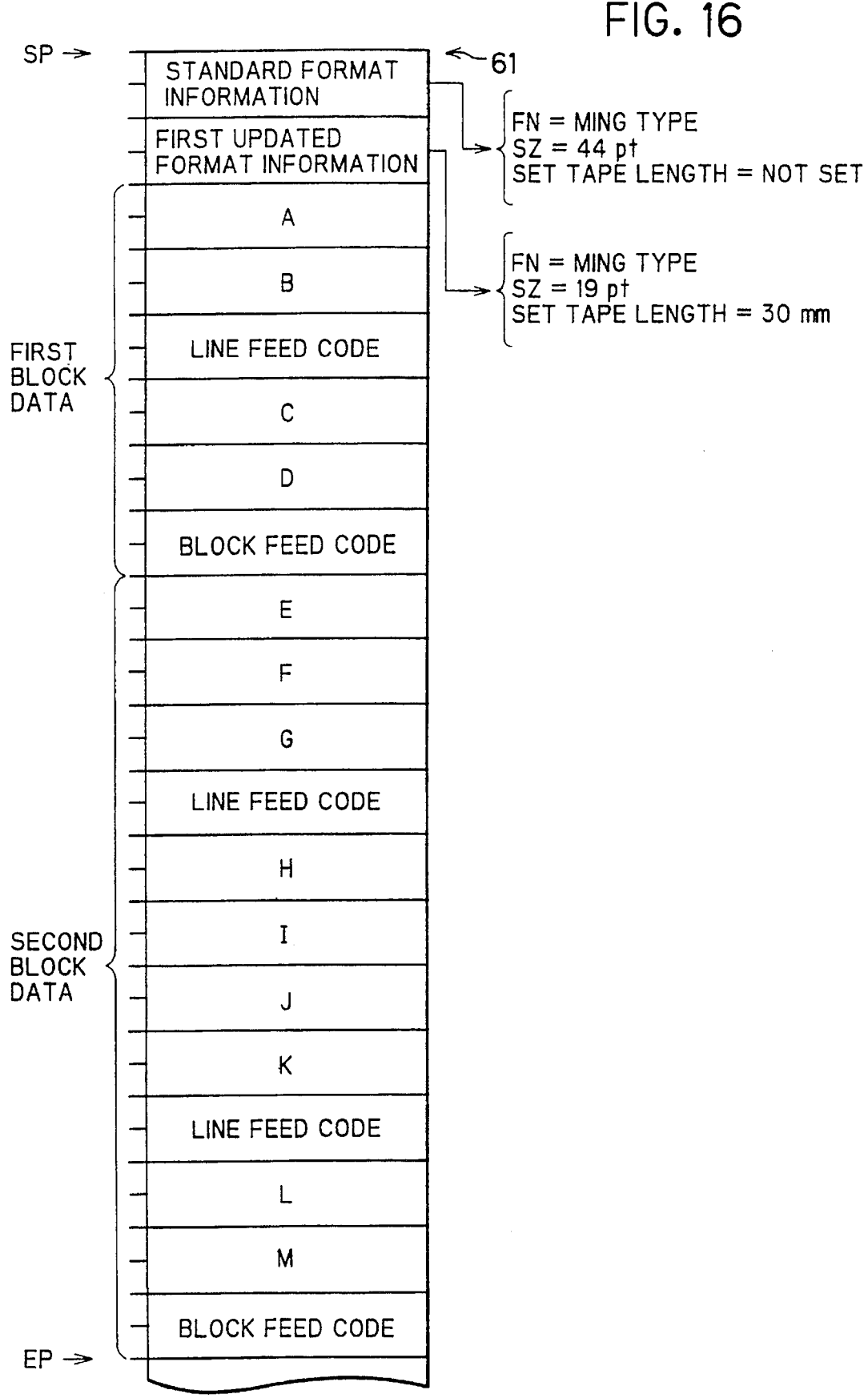
FIG. 16 is a view similar to FIG. 13 but having its format setting data modified.

Furthermore, assume that the tape cassette CS containing the print tape 19 having the tape width of 12 mm is currently loaded and that the text memory 61 accommodates character string data about the first and the second block, as shown in FIG. 16. In that case, operating the format setting key executes the format information setting process. When the print character size is changed to "19 pt" as illustrated (S21), a check on the second block data for print area availability reveals that the printable width of the print tape 19 is exceeded. That is, the print character size SZ of 19 pt (48 dots) results in 144 dots for the total height of three lines (S25 and S26), the 144-dot height being wider than the printable width of 96 dots for the 24 mm wide tape. With the print area of the print tape 19 thus exceeded, the print error flag EF is set ("YES" in S27). The new format information held temporarily in the work memory of the RAM 60 is then erased without being moved to the text memory 61, whereby the change in the format information is invalidated (S28). A message about this error is displayed on the LCD unit 22 (S29), and control returns to S15.

When the print key is operated ("NO" in S15, "YES" in S16, "NO" in S17 and S18, "YES" in S19), a print process is started whereby the print dot pattern data prepared in the print data buffer 66 is output to the print mechanism PM for printing onto the print tape 19 (S23). With the print process completed ("YES" in S24), control returns to S14. The print process, which is similar to conventional printing, proceeds as follows: format information and character codes are first read successively from the text memory 61. In accordance with the print character search table and the print character index table, the print dot pattern data corresponding to the character codes is read from the print CG ROM 54. The data so read out is developed, composed and accommodated in the print data buffer 66 as print dot image data. The print dot image data is output from the print data buffer 66 to the print mechanism PM for printing onto the print tape 19.

When the display mode switching key is operated ("NO" in S15, "YES" in S16, "NO" in S17 through 19, "YES" in S20), the text display control routine is started via S39, and the print image display control routine is stopped (S40).

If any key other than the format setting keys, printable character keys, print key or display mode switching key is operated ("NO" in S15, "YES" in S16, "NO" in S17 through S20), then the process corresponding to the operated key is carried out (S40), and control returns to S14.

The text display control routine (S40) will now be described with reference to the flowchart of FIG. 12.

When the text display control routine is started, the above-mentioned text input screen is displayed along with text data on the LCD unit 22 in the same manner as conventional text display (S75 and S76). For example, if the text memory 61 accommodates the data shown in FIG. 16, the character strings "AB" and "CD" of the first two lines of the first block along with control symbols are displayed on the LCD unit 22, as depicted in FIG. 20.

When any of the printable character keys is operated ("YES" in S77 and S78), the text data storing process is carried out whereby the code data of the operated key is stored as text data into the text memory 61. After the character or symbol in question is displayed on the LCD unit 22 (S81), control returns to S77.

When the print key is operated ("YES" in S77, "NO" in S78, "YES" in S79), a cassette signal TS is read from the cassette sensor 42. On the basis of the cassette signal TS and the printable range table TB1, the number of printable dots corresponding to the tape width of the print tape 19 contained in the currently loaded tape cassette CS is placed into the parameter memory 62 (S82).

A check data generating process control routine is carried out in the same manner as in S25 (S83), followed by a print area judging process control routine performed in the same manner as in S26 (S84). When the result of the check for print area availability is affirmative ("YES" in S85), the print process is performed in S86 in the same manner as in S23. The print dot pattern data prepared in the print data buffer 66 is output to the print mechanism for printing onto the print tape 19 (S86). With the print process completed ("YES" in S87), control returns to S77. If the result of the check for print area availability is negative ("NO" in S85), the print process is stopped (S93). A message about the error is displayed on the LCD unit 22 (S94), and control returns to S77.

If the display mode switching key is operated for switching the display screen from the text display mode to the print image display mode ("YES" in S77, "NO" in S78 and S79, "YES" in S80), a cassette signal TS is read from the cassette sensor 42. The number of printable dots corresponding to the tape width of the print tape 19 contained in the currently loaded tape cassette CS is stored into the parameter memory 62 (S88). A check data generating process control routine is carried out in the same manner as in S83 (S89), followed by an area judging process control routine performed in the same manner as in S84 (S90). When the result of the check for print area availability is affirmative ("YES" in S91), the print image display control routine is started, and the text display control routine is stopped (S92).

If the result of the check for print area availability is negative ("NO" in S91), then a message about the error is displayed on the LCD unit 22 (S94), and control returns to S77.

If any key other than the printable character keys, print key or display mode switching key is operated ("YES" in S77, "NO" in S78 through S80), then the process corresponding to the operated key is carried out (S95), and control returns to S77.

As described, according to the present invention, every time when data for each character is input, there is composed the corresponding print area check dot image data which is the same as print dot image data (S33). The print area check dot image data is checked for print area availability on the print tape 19 (S34). If the data is judged not to be printable within the print area of the print tape 19 ("YES" in S35), then an error alarm is given (S38). Only printable data are thus stored in the text memory 61. Accordingly, there is no need for such additional editing work as modifications of text data or format information upon printing, whereby the print process is simplified. Recognition of print unavailability is followed by activation of the text display control routine whereby character data is not checked for print area availability upon input. In this manner, the user may input desired text data without being on the lookout for print area unavailability subject to the amount of the input text data.

When the tape cassette CS is changed during input of text data ("YES" in S15), the input data is again checked for print area availability on the print tape 19 in the newly loaded tape cassette CS (S33 and S34). That is, the text data is verified at the time of its input for print area availability on the newly-loaded print tape 19.

When format information is set anew (S21), a check is made to see if the text data is printable within the print area of the print tape 19 designated by the updated tape width and tape length (S25 and S26). If the text data is found to exceed the updated print area ("NO" in S27), the updated format information is invalidated (S28). In this manner, only the printable format information is established in keeping with the amount of input text data and the current tape width.

Both the print image display mode and the normal text display mode are provided. Any one of the two modes is selected as desired by operation of the display mode switching key. Thus input text data is displayed on the LCD unit 22 in the desired display mode.

Furthermore, upon switch-over from the text display mode to the print image display mode ("YES" in S80), a check is made to see if the input text data is printable within the print area of the print tape 19 (S89 and S90). Only if the text data is found printable, the print image display mode can be selected. In this manner, the print image display mode is selected only when all relevant print conditions are met to permit printing on the print area of the print table 19.

As described above, according to the present embodiment, when format information is changed, print area check data is generated as per the changed format information (S25). If the check data is found not to be printable within the print area of the tape defined by the printable width and set tape length ("YES" in S27), the changed format information is invalidated (S28), and a message indicating what has taken place appears on the display (S29). Whenever a character or the like is input, the corresponding print check data is generated (S33). If the data is found to be printable within the print area ("NO" in S35), a print-like image of that character is displayed; if the data is found not printable ("YES" in S35), a message indicating the unavailability of printing is displayed (S38), and the corresponding text appears on the display unit (S40).

While the invention has been described in detail with reference to a specific embodiment thereof, it would be apparent to those skilled in the art that various changes and modifications may be made therein without departing from the spirit of the invention, the scope of which is defined by the attached claims.

The print CG ROM 54 may be arranged to store outline data for each of numerous characters in correspondence with their character codes. Whereas the print character size may be set to the maximum character size when initialized, the print character size may ultimately be determined by calculations based on the tape width of the print tape 19 and the number of input character lines.

It is also evident that the invention is applicable to various tape printing apparatuses equipped with a keyboard, a display unit and a printer and capable of displaying input text data in print-like images.

What is claimed is:

1. A tape printing apparatus for printing desired characters onto a tape, the apparatus comprising:

input means for inputting desired characters and commands;

data storing means for storing data of the input characters;

font storing means for storing font data for either one of the outlines and the dot patterns of numerous characters inputtable by the input means, said font storing means storing font data of the numerous characters of several character sizes;

print means for printing characters onto a tape;

format setting means for setting a print format including a character size for printing of the input characters;

display font storing means for storing display dot pattern data for numerous characters inputtable by the input means, said display font storing means storing display dot pattern data of the numerous characters of several display character sizes;

first display data generating means for reading, from said display font storing means, display dot pattern for each of the characters stored in said data storing means and for a display character size corresponding to the character size data set by said format setting means, thereby composing display dot image data for displaying a print image of the characters;

display means with a display unit capable of displaying a plurality of characters upon receipt of display dot image data from the first display data generating means;

tape width detecting means for detecting the width of the tape used;

check data generating means for operating, whenever character data is inputted to be stored into said data storing means, to compose print dot image data for print area check which is similar to print dot image data, on the basis of the character data currently held in said data storing means, of the font data stored in said font storing means, and of the character size data set by said format setting means;

mode setting means for setting a first display mode, the first display mode causing said first display data generating means to operate, wherein said check data generating means operates to compose print dot image data for print area check whenever character data is inputted to be stored into said data storing means during the first display mode; and first area judging means for operating, whenever the print dot image data for print area check is updated, to judge whether printing is available within a print area of the tape, on the basis of the print dot image data for print area check and of the tape width data detected by said tape width detecting means, whereby an error alarm is activated if the printing is judged to be unavailable within the print area.

2. A tape printing apparatus according to claim 1, wherein the first area judging means judges whether the presently stored character can be printed within a print area on the tape, the print area on the tape being determined dependently on the tape width of the tape.

3. A tape printing apparatus according to claim 2, wherein the print format set in the format setting means selectively sets a tape length data within which the desired characters are to be printed, the set tape length and the tape width detected by said tape width detecting means determining the print area of the tape on which the desired characters are to be printed, and wherein the first area judging means judges whether printing is available within the print area of the tape, on the basis of the image data for print area check, the detected tape width data, and the tape length data, if the tape length data is set by the format setting means.

4. A tape printing apparatus according to claim 1, further comprising:

second area judging means for operating, whenever the print format is changed by said format setting means during the first display mode, to cause said check data generating means to update the dot image data for print area check and to judge whether the printing is available within the print area of the tape on the basis of the updated check data, of the tape width data detected by said tape width detecting means and of the tape length data if a tape length is set by said format setting means, whereby an error alarm is activated if the printing is judged to be unavailable within the print area; and data invalidating means for operating, if said second area judging means judges the printing to be unavailable, to invalidate the change of the print format.

5. A tape printing apparatus according to claim 1, further comprising:

tape change detecting means for detecting the change of a tape cassette containing the tape; and first judgment ordering means for causing said check data generating means to update the dot image data for print area check when receiving from said tape change detecting means an output indicating the change of the tape cassette during the first display mode, and for causing said first area judging means to judge whether the printing is available.

6. A tape printing apparatus according to claim 1, further comprising:

second display data generating means for reading display dot pattern data in a predetermined display character size from said display font storing means for each of the characters stored in said data storing means, thereby composing display dot image data for displaying the characters in the predetermined display character size; and wherein said mode setting means selects one of the first display mode and a second display mode, the second display mode causing said second display data generating means to operate.

7. A tape printing apparatus according to claim 6, further comprising first mode switching means for replacing the first display mode with the second display mode if said first area judging means judges the printing to be unavailable in the first display mode.

8. A tape printing apparatus according to claim 7, further comprising:

tape change detecting means for detecting the change of a tape cassette containing the tape; and second judgment ordering means for causing said check data generating means to update the dot image data for print area check when receiving from said tape change detecting means an output indicating the change of the tape cassette, and for causing said first area judging means to judge whether the printing is available.

9. A tape printing apparatus according to claim 8, further comprising second mode switching means for replacing the first display mode with the second display mode if said first area judging means, when activated by order from said second judgment ordering means, judges the printing to be unavailable in the first display mode.

10. A tape printing apparatus according to claim 6, wherein said input means inputs a command for switching the display mode from the second display mode into the first display mode, and wherein said mode setting means causes said first area judging means to judge whether the printing is available when the second display mode is replaced by the first display mode, and selects the first display mode only if said first area judging means judges the printing to be available.

11. A tape printing apparatus according to claim 6, further comprising print image data generating means for reading, from said font storing means, font data for each of the characters stored in said data storing means and for the character size data set by said format setting means, thereby composing print dot image data for printing an image of the characters where the characters of the set character size are arranged at print locations corresponding to the set character size, said print image generating means operating when said input means inputs a print command, said print means printing characters based on the print dot image data, wherein the mode setting means includes display control means for controlling the display means to display, during the first display mode, a print image display screen having a display area corresponding to the detected tape width, wherein said first display data generating means composes display dot image data for displaying a print image of the characters where the characters of the display character size, corresponding to the set character size, are arranged at display locations which correspond to the print locations, wherein said second display data generating means composes display dot image data for displaying the characters in a predetermined display size at predetermined locations, wherein character data for one character is inputted to be stored in said data storing means in response to input of one character by said input means;

wherein said check data generating means operates every time character data for one character is inputted in said data storing means during the first display mode, said check data generating means reading, from said font storing means, font data for each of the characters currently held in said data storing means and for the character size data set by said format setting means, thereby composing print dot image data for print area check for the currently-held characters, the print dot image data for print area check indicating a print image of the currently-held characters where the characters of the set character size are arranged at the print locations; and wherein said first area judging means judges, based on the print dot image data for print area check and the detected tape width, whether the print image of the currently-held characters is possible within the tape width.

12. A tape printing apparatus according to claim 11, further comprising:

check control means for controlling said check data generating means to compose the print dot image data for print area check whenever character data is inputted to said data storing means during the first display mode; and mode control means for controlling the mode setting means to switch the first display mode into the second display mode if said first area judging means judges the printing to be unavailable as a result of the input of the character data to said data storing means during the first display mode.

13. A tape print apparatus according to claim 12, wherein said check control means controls the check data generating means to update print dot image data for print area check whenever said format setting means changes the print format during the first display mode, said mode control means controlling the mode setting means to switch the first display mode into the second display mode if said first area judging means judges the printing to be unavailable as a result of the change in the print format during the first display mode.

14. A tape printing apparatus according to claim 13, further comprising data invalidating means for invalidating the change of the print format if said first area judging means judges the printing to be unavailable as a result of the change in the print format during the first display mode.

15. A tape printing apparatus according to claim 12, further comprising tape change detecting means for detecting the change of a tape cassette containing the tape, wherein said check control means controls the check data generating means to update print dot image data for print area check whenever said tape change detecting means detects the change in the tape during the first display mode, said mode control means controlling the mode setting means to switch the first display mode into the second display mode if said first area judging means judges the printing to be unavailable as a result of the change in the tape during the first display mode.

16. A tape printing apparatus according to claim 11, wherein said input means inputs a command for switching the display mode from the second display mode into the first display mode, and further comprising:

check control means for controlling the check data generating means to update print dot image data for print area check whenever said input means inputs the command for switching the second display mode into the first display mode; and mode control means for controlling the mode setting means to switch the second display mode into the first display mode if said first area judging means judges the printing to be available.

17. A tape printing apparatus according to claim 1, wherein said check data generating means includes:

print location data generating means for generating, based on the set character size and the currently-held character data, print location data indicative of locations where the character data are to be located for printing; and font data arranging means for retrieving the font data for the character data and for developing the retrieved font data at locations indicated by the location data, and wherein said first area judging means judges whether the thus arranged font data are printable within the print area of the tape.

18. A tape printing apparatus according to claim 17, wherein said first display data generating means includes:

another print location data generating means for generating, based on the character size and the character data, print location data indicative of locations where the character data are to be located for printing;

display location data generating means for generating, based on the print location data, display location data indicative of locations where the display dot pattern data for the character data are to be located; and display font data arranging means for retrieving the display dot pattern data for the character data at a display character size corresponding to the set character size and for developing the retrieved dot pattern data at locations indicated by the display location data.

19. A tape printing apparatus for printing desired at least one character onto a tape, the apparatus comprising:

input means for inputting at least one character desired to be printed on a tape and for inputting a command for printing when the input of the desired at least one character is completed;

data storing means for temporarily storing data of the inputted at least one character;

format setting means for setting a print format including a desired character size in which the inputted at least one character is to be printed on the tape;

display font storing means for storing display pattern data for numerous characters inputtable by the input means for displaying;

first display data generating means for reading display pattern data from said display font storing means for each of the characters stored in said data storing means and on the basis of the character size data set by said format setting means, thereby composing display image data for displaying a first display image of the desired characters where the characters of a display character size, corresponding to the character size data, are arranged in display locations corresponding to print locations;

display means for receiving the display image data from the first display data generating means and for displaying the desired at least one character;

print font storing means for storing print pattern data of numerous characters inputtable by the input means for printing;

tape width detecting means for detecting the width of the tape;

check data generating means for reading, every time when data of each of the at least one character is stored into said data storing means, print pattern data from said print font storing means for each of the at least one character currently stored in said data storing means and on the basis of the character size data set by said format setting means, thereby producing image data for print area check for the currently stored character, the image data indicating a print image where the currently-stored character of the character size is arranged in a print location;

mode setting means for setting a first display mode for operating said first display data generating means, wherein said check data generating means operates to read, whenever data of each of the at least one character are stored into said data storing means during the first display mode, print pattern data from said print font storing means for each of the one or more characters currently stored in said data storing means and on the basis of the character size data set by said format setting means, thereby producing image data for print area check for the currently stored character;

first area judging means for judging whether the currently stored character can be printed on the tape on the basis of the image data for print area check and the tape width data detected by said tape width detecting means, whenever the image data for print area check is produced, to thereby indicate that the printing is unavailable if the printing is judged to be unavailable on the tape;

print image data generating means for receiving the command for printing from the input means and for reading print pattern data from said font storing means for each of the desired at least one character completely stored in said data storing means and on the basis of the character size data set by said format setting means, thereby composing print image data for the desired at least one character, the print image data indicating a print image where the at least one character of the character size is arranged in the print location; and print means for receiving the print image data for the desired at least one character and for printing the desired at least one character onto the tape.

20. A tape printing apparatus according to claim 19, wherein the first area judging means judges whether the currently stored character can be printed within a print area on the tape, the print area on the tape being determined dependently on the tape width of the tape.

21. A tape printing apparatus according to claim 20, wherein the print format set in the format setting means selectively sets a tape length data within which the desired at least one character is to be printed, the set tape length and the tape width detected by said tape width detecting means determining the print area of the tape on which the desired at least one character is to be printed, and wherein the first area judging means judges whether printing is available within the print area of the tape, on the basis of the image data for print area check, the detected tape width data, and the tape length data, if the tape length data is set by the format setting means.

22. A tape printing apparatus according to claim 21, further comprising:

second area judging means for causing said check data generating means to update the image data for print area check, whenever said format setting means changes the format before the command for printing is inputted by said input means during the first display mode, so as to judge whether the printing is available within the print area of the tape on the basis of the updated check data, the tape width data detected by said tape width detecting means, and the tape length data in the set format if the tape length data is set, to thereby indicate that the printing is unavailable if the printing is judged to be unavailable within the print area; and data invalidating means for invalidating the change of the print format by said format setting means if said second area judging means judges the printing to be unavailable.

23. A tape printing apparatus according to claim 19, wherein said printing means includes a printing mechanism for receiving a tape cassette containing a tape and for printing the desired at least one character onto the tape in the tape cassette, and wherein said tape width detecting means further detects the change of a tape cassette received in the printing mechanism.

24. A tape printing apparatus according to claim 23, further comprising:

first judgment ordering means for causing said check data generating means to update the image data for print area check when receiving from said tape change detecting means an output indicating the change of the tape cassette before the command for printing is inputted by said input means during the first display mode, and for causing said first area judging means to judge whether the printing is available.

25. A tape printing apparatus according to claim 19, further comprising:

second display data generating means for reading display pattern data in a predetermined display size from said display font storing means for each of the one or more characters stored in said data storing means, thereby composing display image data for displaying a second display image of the characters where the characters in the predetermined display size are arranged in predetermined display locations; and wherein said mode setting means selects one of the first display mode for operating said first display data generating means and a second display mode for operating said second display data generating means.

26. A tape printing apparatus according to claim 25, further comprising first mode switching means for switching an operating mode from the first display mode into the second display mode when said first area judging means judges the printing to be unavailable in the first display mode.

27. A tape printing apparatus according to claim 26, wherein said printing means includes a printing mechanism for receiving a tape cassette containing a tape and for printing the desired at least one character onto the tape in the tape cassette, and wherein said tape width detecting means further detects the change of a tape cassette received in the printing mechanism.

28. A tape printing apparatus according to claim 27, further comprising:

second judgment ordering means for causing said check data generating means to update the check data when receiving from said tape change detecting means an output indicating the change of the tape cassette before the command for printing is inputted by said input means, and for causing said first area judging means to judge whether the printing is available.

29. A tape printing apparatus according to claim 28, further comprising second mode switching means for switching the operating mode from the first display mode into the second display mode if said first area judging means, caused by the second judgement ordering means to judge, judges the printing to be unavailable in the first display mode.

30. A tape printing apparatus according to claim 25, wherein said mode setting means causes said first area judging means to judge whether the printing is available when said inputting means inputs a command for switching the operating mode from the second display mode into the first display mode, and selects the first display mode only if said first area judging means judges the printing to be available.

* * * * *